United States Patent
Sugitani et al.

(10) Patent No.: US 9,581,848 B2
(45) Date of Patent: Feb. 28, 2017

(54) LIQUID CRYSTAL DISPLAY

(71) Applicant: Samsung Display Co., Ltd., Yongin, Gyeonggi-Do (KR)

(72) Inventors: Koichi Sugitani, Hwaseong-si (KR); Yang-Ho Jung, Seoul (KR); Hoon Kang, Suwon-si (KR); Jin Ho Ju, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 9 days.

(21) Appl. No.: 14/338,123

(22) Filed: Jul. 22, 2014

(65) Prior Publication Data
US 2015/0205153 A1 Jul. 23, 2015

(30) Foreign Application Priority Data
Jan. 17, 2014 (KR) ........................ 10-2014-0006317

(51) Int. Cl.
*G02F 1/136* (2006.01)
*G02F 1/1333* (2006.01)

(52) U.S. Cl.
CPC ............................. *G02F 1/133377* (2013.01)

(58) Field of Classification Search
CPC ................ G02F 1/1368; G02F 1/1341; G02F 1/136227; G02F 1/1339; G02F 1/133377
USPC ......................................................... 349/43
See application file for complete search history.

(56) References Cited

U.S. PATENT DOCUMENTS

| 6,141,072 | A | 10/2000 | Drabik et al. |
| 7,005,244 | B2 | 2/2006 | Park et al. |
| 2004/0209195 | A1 | 10/2004 | Lin |
| 2013/0182203 | A1 | 7/2013 | Lee et al. |
| 2014/0111746 | A1* | 4/2014 | Kim ................. G02F 1/133377 349/106 |
| 2014/0347611 | A1* | 11/2014 | Kim et al. ................... 349/106 |

FOREIGN PATENT DOCUMENTS

| JP | 05-206082 A | 8/1993 |
| JP | 2007-140556 A | 6/2007 |
| JP | 2008-213061 A | 9/2008 |
| JP | 2010-123840 A | 6/2010 |
| JP | 2012-018390 A | 1/2012 |
| KR | 10-2012-0026880 A | 3/2012 |
| KR | 10-1235239 B1 | 2/2013 |
| KR | 10-2013-0092922 A | 8/2013 |

* cited by examiner

Primary Examiner — Nathanael R Briggs
Assistant Examiner — William Peterson
(74) Attorney, Agent, or Firm — Knobbe Martens Olson & Bear LLP

(57) ABSTRACT

A liquid crystal display includes: a substrate including a major surface; a thin film transistor disposed over the substrate; a pixel electrode connected to the thin film transistor and disposed over the thin film transistor; a common electrode facing the pixel electrode; a roof layer disposed over the common electrode; a microcavity disposed between the pixel electrode and the common electrode; and a liquid crystal material contained in the microcavity, in which a side wall of the microcavity has an angle of 80° to 90° with respect to the major surface.

15 Claims, 31 Drawing Sheets

LIQUID CRYSTAL DISPLAY

CROSS-REFERENCE TO RELATED APPLICATION

This application claims priority to and the benefit of Korean Patent Application No. 10-2014-0006317 filed in the Korean Intellectual Property Office on Jan. 17, 2014, the entire contents of which are incorporated herein by reference.

BACKGROUND (a) Technical Field

The present disclosure relates to a liquid crystal display.

(b) Description of the Related Art

A liquid crystal display which is one of the most common types of flat panel displays currently in use, includes two sheets of display panels with field generating electrodes such as a pixel electrode and a common electrode, and a liquid crystal layer interposed therebetween.

The liquid crystal display generates an electric field in the liquid crystal layer by applying voltage to the field generating electrodes, determines the direction of liquid crystal molecules of the liquid crystal layer by the generated electric field, and controls polarization of incident light, thereby displaying images.

As one of the liquid crystal displays, a technique of implementing a display by forming a plurality of microcavities in a pixel and filling a liquid crystal therein has been developed. Two sheets of substrates are used in a liquid crystal display in the related art, but the technique may reduce a weight, a thickness, and the like of the device by forming constituent elements on one substrate.

The above information disclosed in this Background section is only for enhancement of understanding of the background of the invention and therefore it may contain information that does not form the prior art that is already known in this country to a person of ordinary skill in the art.

SUMMARY

An aspect of the present invention provides a liquid crystal display including microcavities having advantages of maximizing an area of microcavities in which an electric field is generated.

Embodiments of the present invention provides a liquid crystal display, comprising: a substrate comprising a major surface; a thin film transistor disposed over the substrate; a pixel electrode electrically connected to the thin film transistor and disposed over the thin film transistor; a common electrode facing the pixel electrode; a roof layer disposed over the common electrode; a microcavity disposed between the pixel electrode and the common electrode; and a liquid crystal material contained in the microcavity, wherein a side wall of the microcavity has an angle of 80° to 90° with respect to the major surface.

The foregoing display further comprises a capping layer disposed over the roof layer. In the foregoing display, the microcavity may be surrounded by walls with a liquid crystal injection hole through which the liquid crystal material has been injected, and wherein the liquid crystal injection hole is covered by the capping layer. The foregoing liquid crystal display may further comprise a gate line and a data line disposed over the substrate and connected to the thin film transistor. The foregoing liquid crystal display may further comprise a second microcavity and a partition disposed between the microcavity and the second microcavity, and the partition extending along the data line. The liquid crystal injection hole may be positioned at the side of the microcavity.

Still in the foregoing display, the liquid crystal display may further comprise a third microcavity and a second partition disposed between the microcavity and the third microcavity, and the second partition covering the liquid crystal injection hole, and extending along the gate line. The liquid crystal injection hole may be positioned at the top of the microcavity. The liquid crystal display may further comprise a third microcavity and a second partition disposed between the microcavity and the third microcavity, and the second partition extending along the gate line. The second partition may be formed of a portion of the roof layer.

Embodiments of the present invention further provide a method of making a liquid crystal display, comprising: forming a thin film transistor over a substrate comprising a major surface; forming a pixel electrode electrically connected to the thin film transistor; sequentially forming a sacrificial layer and a common electrode over the pixel electrode; patterning the common electrode to form a first opening and a second opening; etching the sacrificial layer exposed by the first opening and the second opening using the common electrode as a mask to form a first channel and a second channel in the sacrificial layer, respectively; forming a lower insulating layer over the common electrode and within the first channel and the second channel; curing an upper portion of the sacrificial layer and a lower portion of the sacrificial layer to form an upper alignment layer and a lower alignment layer, respectively; forming a roof layer over the lower insulating layer; removing the lower insulating layer and the roof layer positioned within the first channel; removing a portion of the sacrificial layer which is located between the upper alignment layer and the lower alignment layer to form a microcavity with a liquid crystal injection hole; injecting a liquid crystal material into the microcavity through the liquid crystal injection hole; and forming a capping layer over the roof layer and within the first channel to cover the liquid crystal injection hole, wherein a side surface of the sacrificial layer exposed through each of the first channel and the second channel has an angle of 80° to 90° with respect to the major surface.

In the foregoing method, the sacrificial layer may be formed of an alignment layer forming material. The curing of the upper portion of the sacrificial layer and the lower portion of the sacrificial layer may be performed by heat generated when the lower insulating layer is cured. The etching of the sacrificial layer may be performed by dry etching. The liquid crystal injection hole may be positioned at the side of the microcavity. A side wall of the microcavity may have an angle of 80° to 90° with respect to the major surface.

Embodiments of the present invention provide a method of making a liquid crystal display, comprising: forming a thin film transistor over a substrate comprising a major surface; forming a pixel electrode electrically connected to the thin film transistor; sequentially forming a lower alignment layer, a sacrificial layer, an upper alignment layer, and a common electrode over the pixel electrode; patterning the common electrode to form a first channel and a second channel; etching the upper alignment layer, the sacrificial layer and the lower alignment layer using the common electrode as a mask to form a first channel and a second channel; sequentially forming a lower insulating layer and a roof layer over the common electrode and within the first channel and the second channel; forming a liquid crystal injection hole through the upper alignment layer, the lower insulating layer and the roof layer; removing the sacrificial layer to form a microcavity; injecting a liquid crystal material into the microcavity through the liquid crystal injection hole; and forming a capping layer over the roof layer to cover the liquid crystal injection hole, wherein a side surface of the sacrificial layer exposed through each of the first channel and the second channel has an angle of 80° to 90° with respect to the major surface.

In the foregoing method, the etching of the upper alignment layer, the sacrificial layer, and the lower alignment layer may be performed by a dry etching process. The liquid crystal injection hole may be formed at the top of the microcavity. A side wall of the microcavity may have an angle of 80° to 90° with respect to the major surface.

As such, according to the exemplary embodiments of the present invention, a side profile or sidewall of the microcavity may be set to 80° to 90° with respect to a horizontal plane by dry-etching a sacrificial layer by using a common electrode as a mask. Accordingly, an area of the microcavity in which an electric field is generated by a common electrode and a pixel electrode may be maximized, and a space through which light of the microcavity passes may be maximized.

DETAILED DESCRIPTION OF EMBODIMENTS

Figure 1:
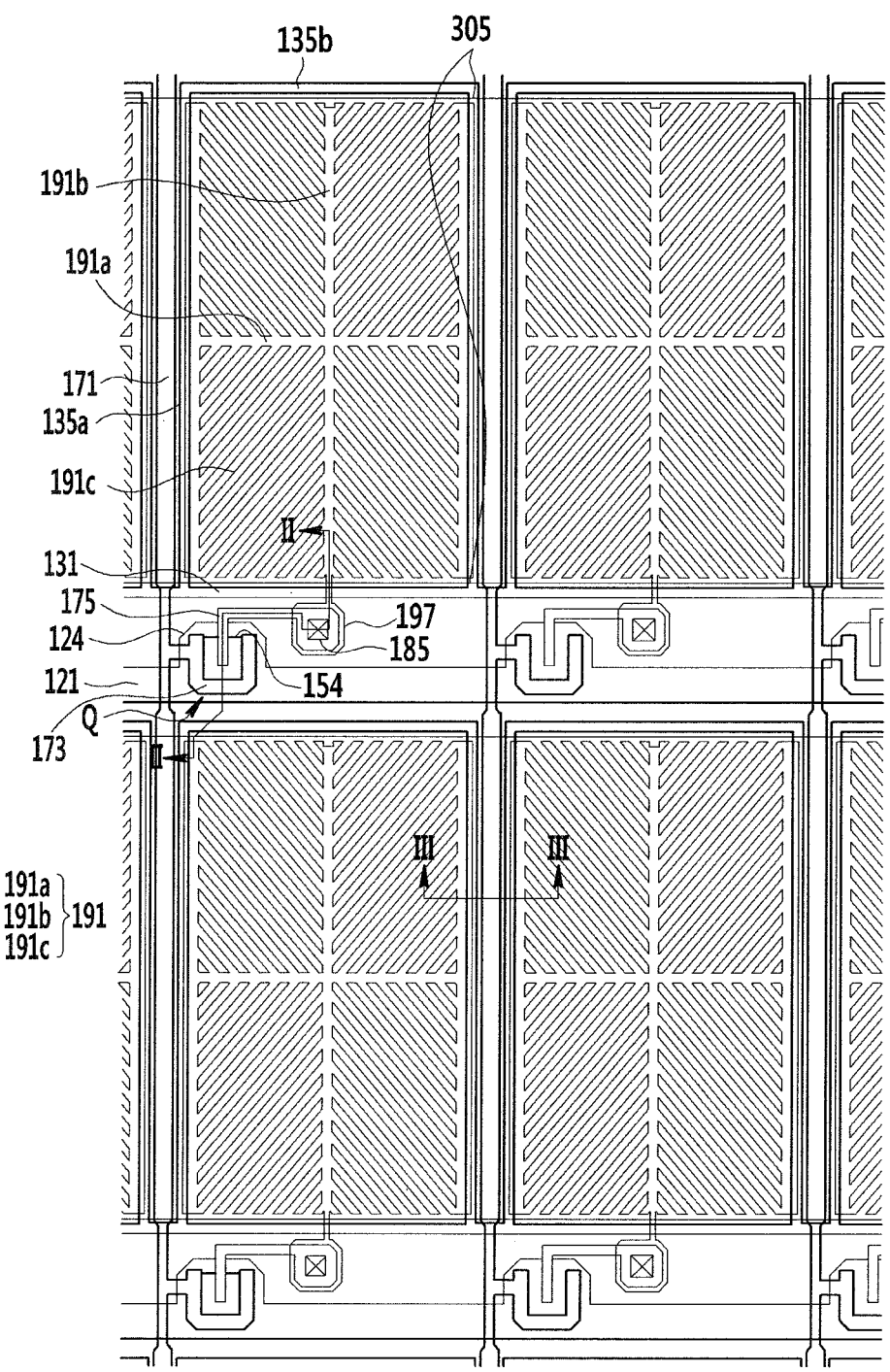
FIG. 1 is a plan view illustrating a liquid crystal display according to an exemplary embodiment of the present invention.

Hereinafter, exemplary embodiments of the present invention will be described in detail with reference to the accompanying drawings. As those skilled in the art would realize, the described embodiments may be modified in various different ways, all without departing from the spirit or scope of the present invention. On the contrary, exemplary embodiments introduced herein are provided to make disclosed contents thorough and complete and sufficiently transfer the spirit of the present invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Figure 2:
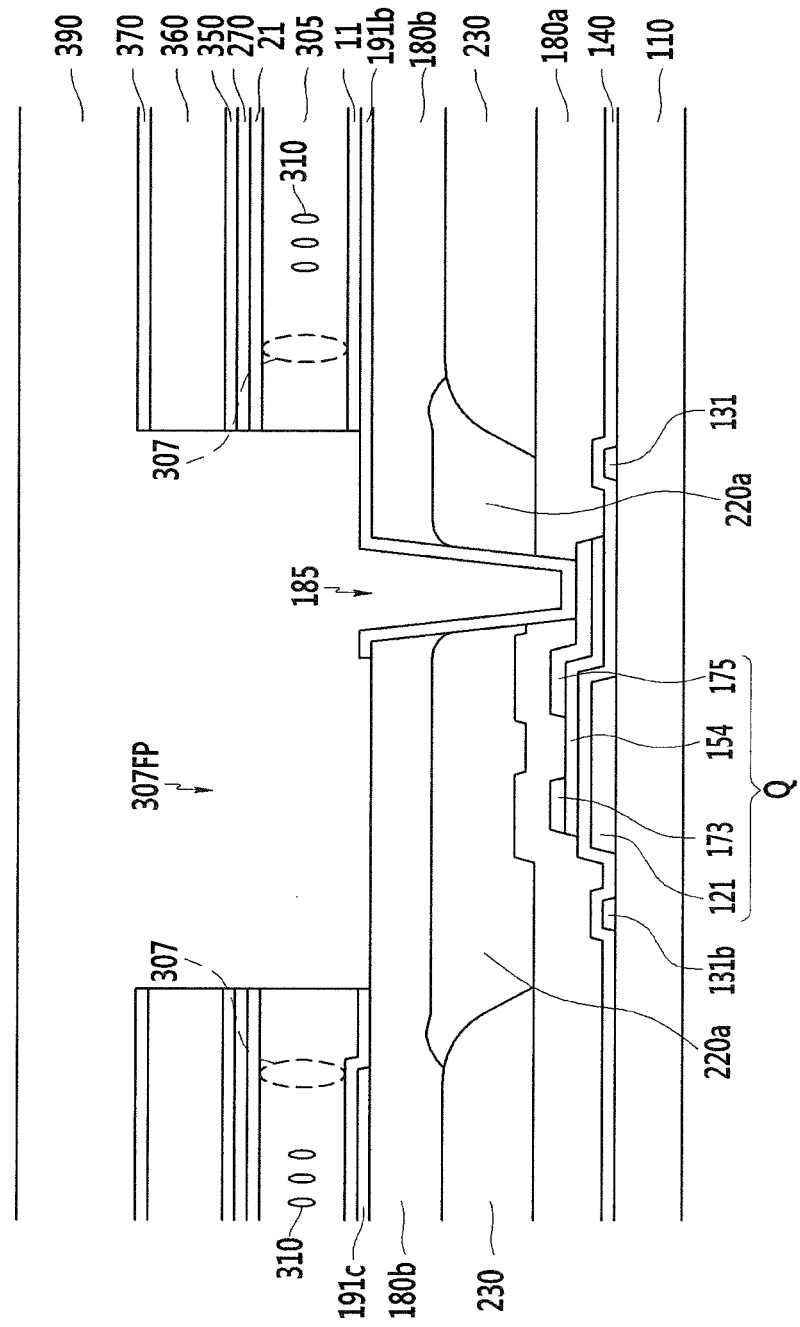
FIG. 2 is a cross-sectional view of FIG. 1 taken along line II-II.
Figure 3:
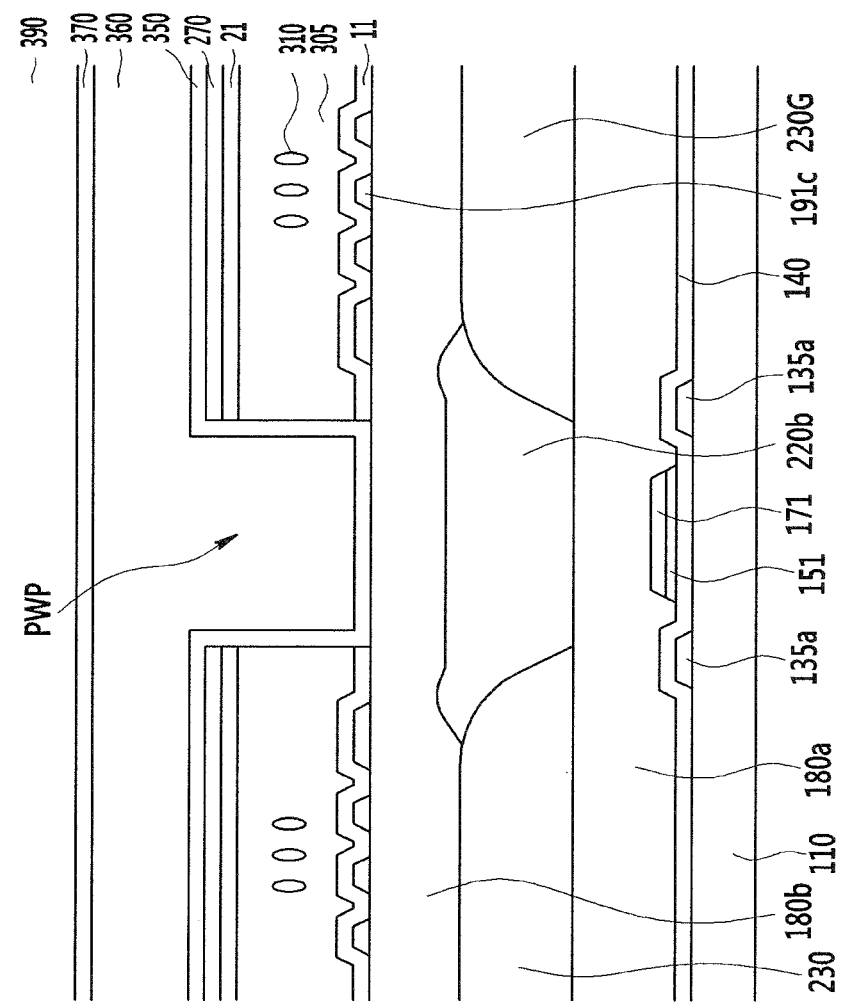
FIG. 3 is a cross-sectional view of FIG. 1 taken along line III-III.

FIG. 1 is a plan view illustrating a liquid crystal display according to an exemplary embodiment of the present invention. FIG. 2 is a cross-sectional view of FIG. 1 taken along line II-II. FIG. 3 is a cross-sectional view of FIG. 1 taken along line III-III.

Referring to FIGS. 1 to 3, a gate line 121 and a storage electrode line 131 are disposed on a substrate 110 made of transparent glass, plastic, or the like.

The gate line 121 extends mainly in a first direction and transfers a gate signal. The gate line 121 includes a gate electrode 124 protruding from the gate line.

The storage electrode line 131 mainly extends in the first direction and transfers a predetermined voltage such as a common voltage Vcom. The storage electrode line 131 includes a pair of vertical portions 135a that extend to be substantially vertical to the gate line 121, and a horizontal portion 135b connecting ends of the pair of vertical portions 135a. The vertical portions and the horizontal portion 135a and 135b of the storage electrode line 131 surround a pixel electrode 191 to be described below.

A gate insulating layer 140 is disposed on the gate line 121 and the storage electrode line 131.

A semiconductor layer 151 is disposed on the gate insulating layer 140. The semiconductor layer 151 includes a protrusion 154 overlapping with the gate electrode 124.

A date line 171 including a source electrode 173 and a drain electrode 175 are disposed on the semiconductor layer 151.

The data line 171 transfers a data signal and mainly extends in a second direction to cross the gate line 121 and the storage electrode line 131. The second direction is substantially perpendicular to the first direction. The source electrode 173 protrudes toward the gate electrode 124 and is disposed on the protrusion 154 of the semiconductor layer 151. The drain electrode 175 is separated from the data line 171 and disposed on the protrusion 154 of the semiconductor layer 151. The drain electrode 175 faces the source electrode 173 based on the gate electrode 124.

The gate electrode 124, the source electrode 173, and the drain electrode 175 form one thin film transistor Q together with the protrusion 154 of the semiconductor layer 151, and a channel of the thin film transistor Q is formed in the protrusion 154 of the semiconductor layer 151 between the source electrode 173 and the drain electrode 175.

Ohmic contacts may be disposed between the semiconductor layer 151 and the data line 171 and between the protrusion 154 of the semiconductor layer 151 and the source electrode 173 and the drain electrode 175 to serve to reduce a contact resistance therebetween.

A first interlayer insulating layer 180a is disposed on the data line 171, the drain electrode 175, the protrusion 154 of the semiconductor layer 151 between the source electrode 173 and the drain electrode 175, and the gate insulating layer 140. The first interlayer insulating layer 180a may include an inorganic insulator such as silicon nitride (SiNx) and silicon oxide (SiOx) or an organic insulator.

A color filter 230, a horizontal light blocking member 220a, and a vertical light blocking member 220b are formed on the first interlayer insulating layer 180a.

The horizontal light blocking member 220a is disposed in a direction parallel with the gate line 121, and the vertical light blocking member 220b is disposed in a direction parallel with the data line 171. The horizontal light blocking member 220a and the vertical light blocking member 220b are connected to each other to have a lattice structure having an opening corresponding to an area displaying an image, and include a material which does not transmit light.

The color filter 230 is disposed in the opening by the horizontal light blocking member 220a and the vertical light blocking member 220b, and may display one of the primary colors such as three primary colors of red, green, and blue. However, the color filter 230 is not limited to the three primary colors of red, green and blue, but may display one of cyan, magenta, yellow, and white-based colors. The color filter 230 may include a material causing a pixel to display a color.

A second interlayer insulating layer 180b is disposed on the color filter 230, the horizontal light blocking member 220a, and the vertical light blocking member 220b. The second interlayer insulating layer 180b may include an inorganic insulator such as silicon nitride (SiNx) and silicon oxide (SiOx) or an organic insulator. Unlike those illustrated in the cross-sectional view of FIG. 2, when a step is generated due to a difference in thickness between the color filter 230 and the horizontal light blocking member 220a, the second interlayer insulating layer 180b includes the organic insulator to reduce or remove the step.

A contact hole 185 exposing a part of the drain electrode 175 is formed in the horizontal light blocking member 220a, and the first and second interlayer insulating layers 180a and 180b.

A pixel electrode 191 connected with the drain electrode 175 through the contact hole 185 is disposed on the second interlayer insulating layer 180b. The pixel electrode 191 may be made of a transparent conductive material such as ITO or IZO.

An overall shape of the pixel electrode 191 is a quadrangle, and includes a cross stem configured by a horizontal stem 191a and a vertical stem 191b crossing the horizontal stem 191a. Further, the pixel electrode 191 is divided into four subregions by the horizontal stem 191a and the vertical stem 191b, and each subregion includes a plurality of minute branches 191c. Further, in the exemplary embodiment, the pixel electrode 191 may further include an outer stem surrounding an outside of the pixel electrode 191.

The minute branch 191c of the pixel electrode 191 forms an angle of approximately 40° to 45° with respect to the gate line 121 or the horizontal stem 191a. Further, the minute branches 191c of two adjacent subregions may be perpendicular to each other. Further, widths of the minute branches 191c are gradually increased, or distances between the minute branches 191c may vary.

The pixel electrode 191 includes an extension 197 which is connected to a lower end of the vertical stem 191b and has a larger area than the vertical stem 191b, and is physically and electrically connected with the drain electrode 175 through the contact hole 185 at the extension 197 to receive a data voltage from the data electrode 175.

The thin film transistor Q and the pixel electrode 191 described above are just described as an example, and a structure of the thin film transistor and a design of the pixel electrode may be modified in order to improve side visibility.

A lower alignment layer 11 is disposed on the pixel electrode 191, an upper alignment layer 21 is disposed at a location to face the lower alignment layer 11, and a microcavity 305 is disposed between the lower alignment layer 11 and the upper alignment layer 21.

The lower alignment layer 11 and the upper alignment layer 21 may be vertical alignment layers. The lower alignment layer 11 and the upper alignment layer 21 may include at least one of materials generally used as a liquid crystal alignment layer such as polyamic acid, polysiloxane, polyimide, or the like.

A liquid crystal material including liquid crystal molecules 310 is injected into the microcavity 305, and the microcavity 305 has a liquid crystal injection hole 307 through which the liquid crystal material is injected. The liquid crystal injection hole 307 is positioned at the side of the microcavity 305.

Here, a side wall or side profile of the microcavity 305 has an angle of 80° to 90° with respect to a horizontal plane, which is substantially parallel to a major surface of the substrate.

A plurality of microcavities 305 are separated from each other by a plurality of liquid crystal injection hole formation regions 307FP (see FIG. 17) positioned to overlap with the gate line 121 when viewed in a viewing direction perpendicular to the major surface of the substrate, and extend along the gate line 121. Each of the plurality of microcavities 305 may correspond to one or two or more pixels, and the pixel area may correspond to the area displaying an image.

A common electrode 270 and a lower insulating layer 350 are positioned on the upper alignment layer 21. The common electrode 270 receives a common voltage and generates an electric field together with the pixel electrode 191 to which the data voltage is applied to determine tilt directions of the liquid crystal molecules 310 positioned in the microcavity 305 between the two electrodes. The common electrode 270 forms a capacitor together with the pixel electrode 191 to maintain the applied voltage even after the thin film transistor is turned off. The lower insulating layer 350 includes silicon nitride (SiNx) or silicon oxide (SiO$_2$).

Meanwhile, since the side wall or side profile of the microcavity 305 has an angle of 80° to 90° with respect to a horizontal plane, the side of the microcavity 305 may be substantially vertical to the horizontal plane. As a result, an area of the microcavity 305 in which an electric field is generated by the common electrode 270 and the pixel electrode 191 may be maximized, and a space through which light of the microcavity 305 passes may be maximized.

In the exemplary embodiment, the common electrode 270 is formed on the microcavity 305, but in another exemplary embodiment, the common electrode 270 is formed below the microcavity 305 and thus the liquid crystal may be driven according to an in-plane switching mode.

A roof layer 360 is disposed on the lower insulating layer 350. The roof layer 360 serves to support the microcavity 305 to be formed the microcavity 305 which is a space between the pixel electrode 191 and the common electrode 270. The roof layer 360 may include a photoresist, or other organic materials.

The upper insulating layer 370 is disposed on the roof layer 360. The upper insulating layer 370 may contact an upper surface of the roof layer 360. The upper insulating layer 370 includes silicon nitride (SiNx) or silicon oxide (SiO$_2$).

A capping layer 390 is disposed on the upper insulating layer 370 and in the liquid crystal injection hole formation region 307FP. The capping layer 390 fills the liquid crystal injection hole formation region 307FP and covers the liquid crystal injection hole 307 of the microcavity 305 exposed by the liquid crystal injection hole formation region 307FP. The capping layer 390 includes an organic material or an inorganic material.

Meanwhile, as illustrated in FIG. 3, a partition wall formation portion PWP is disposed between the microcavities 305 adjacent to each other in the first direction. The partition wall formation portion PWP may be formed in an extending direction of the data line 171 and covered by the roof layer 360. The lower insulating layer 350, the common electrode 270, the upper insulating layer 370, and the roof layer 360 are filled in the partition wall formation portion PWP, and the structure may form a partition wall to partition or define the microcavity 305.

Hereinafter, a manufacturing method of the liquid crystal display according to the exemplary embodiment of the present invention will be described with reference to FIGS. 4 to 16 and FIGS. 1 to 3. An exemplary embodiment to be described below is an exemplary embodiment of the manufacturing method and may be modified in another form.

FIGS. 4 to 18 are cross-sectional views illustrating a manufacturing method of a liquid crystal display according to an exemplary embodiment of the present invention. FIGS. 4, 6, 8, 10, 12, 14, 15, and 17 illustrate cross-sectional views of FIG. 1 taken along line II-II in the order of the manufacturing method. FIGS. 5, 7, 9, 11, 13, 16, and 18 illustrate cross-sectional views of FIG. 1 taken along line III-III in the order of the manufacturing method.

Figure 4:
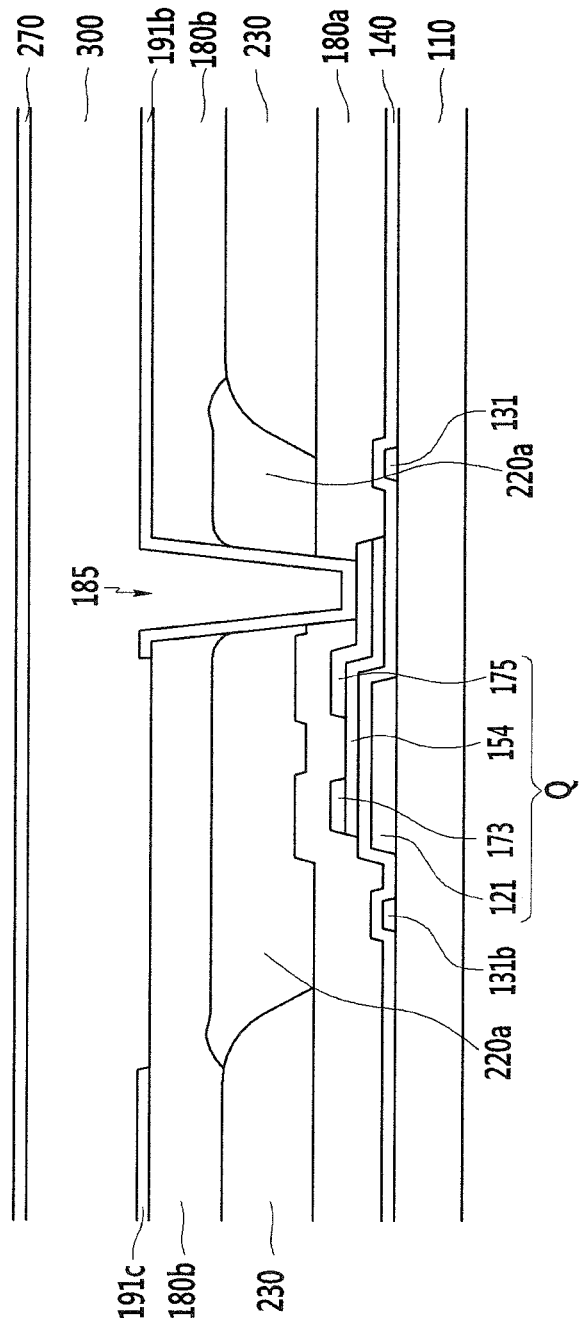
FIGS. 4 to 18 are cross-sectional views illustrating a manufacturing method of a liquid crystal display according to an exemplary embodiment of the present invention.
Figure 5:
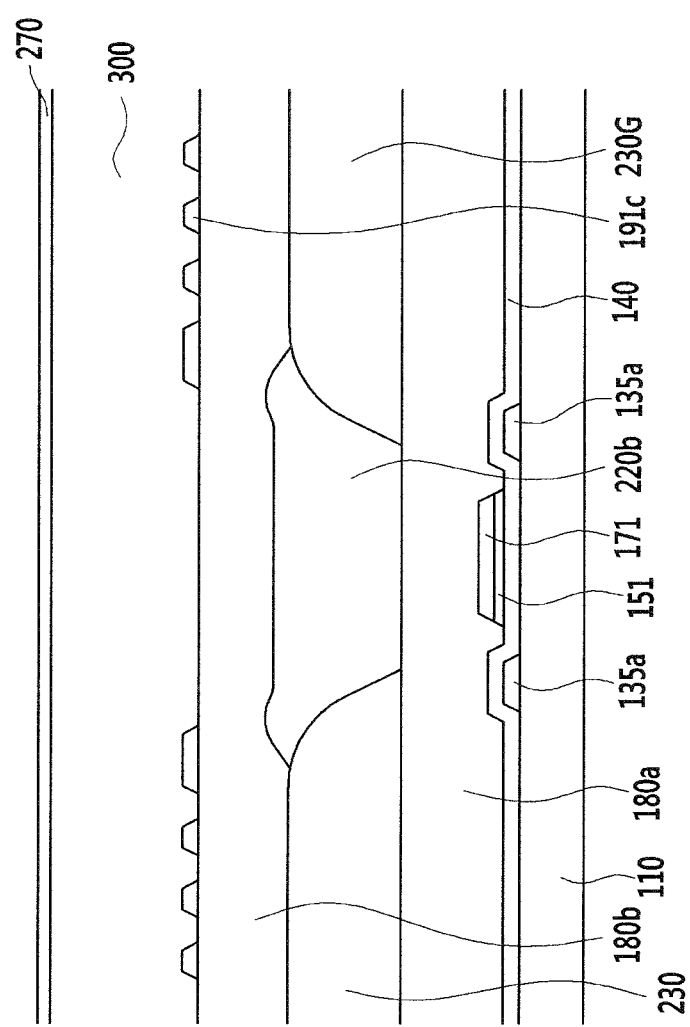

Referring to FIGS. 1, 4, and 5, the gate line 121 and the storage electrode line 131 are formed on the substrate 110, the gate insulating layer 140 is formed on the gate line 121 and the storage electrode line 131, the semiconductor layer 151 is formed on the gate insulating layer 140, and then the data line 171 and the drain electrode 175 are formed on the semiconductor layer 151.

Here, the gate line 121 and the storage electrode line 131 extend in a first direction, and the data line 171 crosses the gate line 121 and the storage electrode line 131 and extends in a second direction that is substantially perpendicular to the first direction. Further, the gate line 121 includes the gate electrode 124 protruding therefrom, the semiconductor layer 151 includes the protrusion 154 overlapping with the gate electrode 124, and the data line 171 protrudes toward the gate electrode 124 and includes the source electrode 173 formed on the protrusion 154 of the semiconductor layer 151. The drain electrode 175 is separated from the data line 171, formed on the protrusion 154 of the semiconductor layer 151, and faces the source electrode 173 based on the gate electrode 124.

In addition, the first interlayer insulating layer 180a is formed on the data line 171, the drain electrode 175, the protrusion 154 of the semiconductor layer 151 between the source electrode 173 and the drain electrode 175, and the gate insulating layer 140, and the color filter 230, the horizontal light blocking member 220a, and the vertical light blocking member 220b are formed on the first interlayer insulating layer 180a.

Herein, the horizontal light blocking member 220a is formed to extend in a direction parallel with the gate line 121, and the vertical light blocking member 220b is formed to extend in a direction parallel with the data line 171. The horizontal light blocking member 220a and the vertical light blocking member 220b are connected to each other to have a lattice structure having an opening, and the color filter 230 is formed in the opening by the horizontal light blocking member 220a and the vertical light blocking member 220b.

In addition, the second interlayer insulating layer 180b is formed on the color filter 230, the horizontal light blocking member 220a, and the vertical light blocking member 220b, and then the contact hole 185 exposing a part of the drain electrode 175 is formed in the horizontal light blocking member 220a, and the first and second interlayer insulating layers 180a and 180b.

In addition, the pixel electrode 191 connected with the drain electrode 175 through the contact hole 185 is formed on the second interlayer insulating layer 180b.

Subsequently, a sacrificial layer 300 is formed on the pixel electrode 191 and the second interlayer insulating layer 180b, and the common electrode 270 is formed on the sacrificial layer 300. Herein, the sacrificial layer 300 is formed of an alignment layer forming material such as polyimide.

Figure 6:
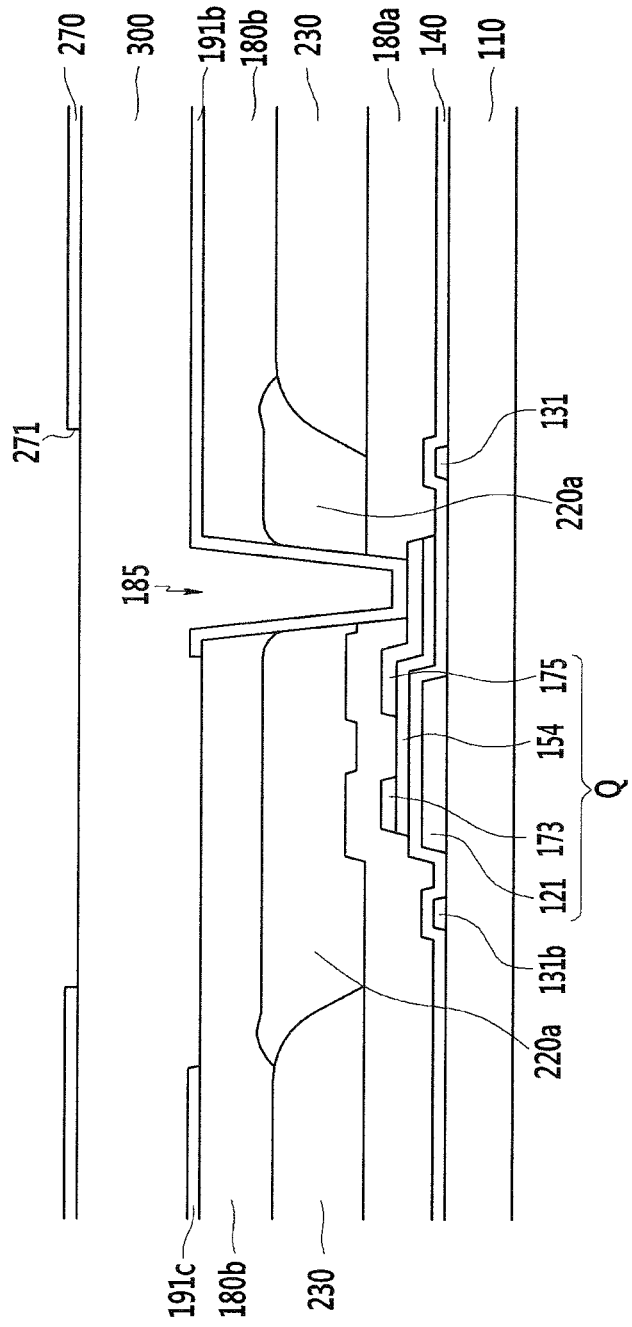
Figure 7:
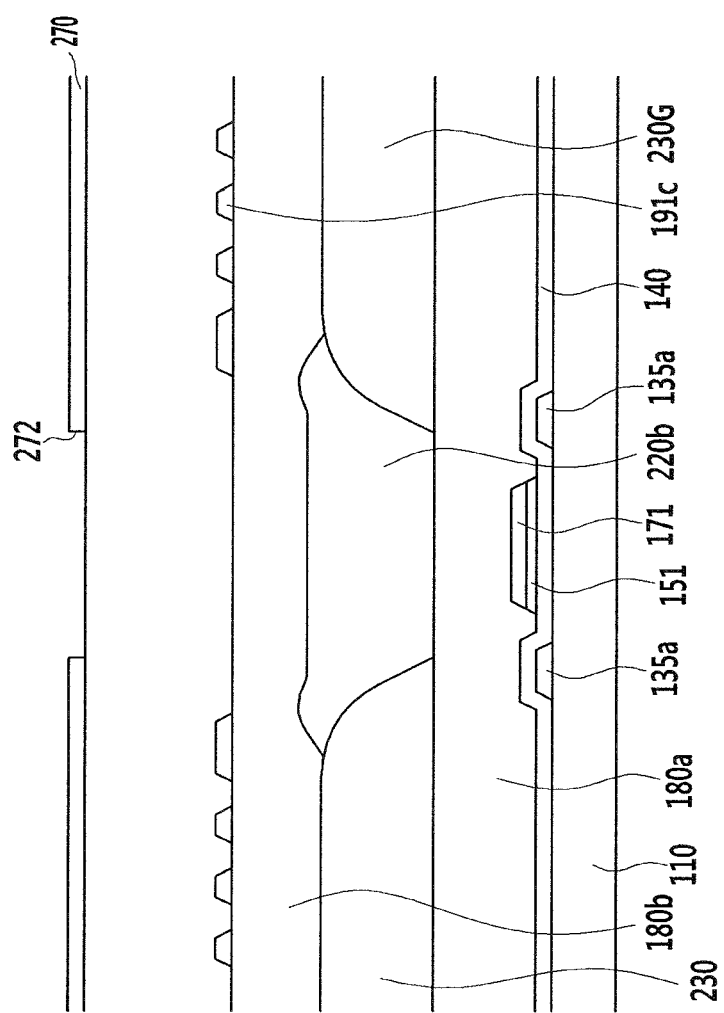

Referring to FIGS. 6 and 7, a first opening 271 and a second opening 272 are formed by patterning the common electrode 270. The first opening 271 is formed at the portion corresponding to the horizontal light blocking member 220a, and the second opening 272 is formed at the portion corresponding to the vertical light blocking member 220b.

Figure 8:
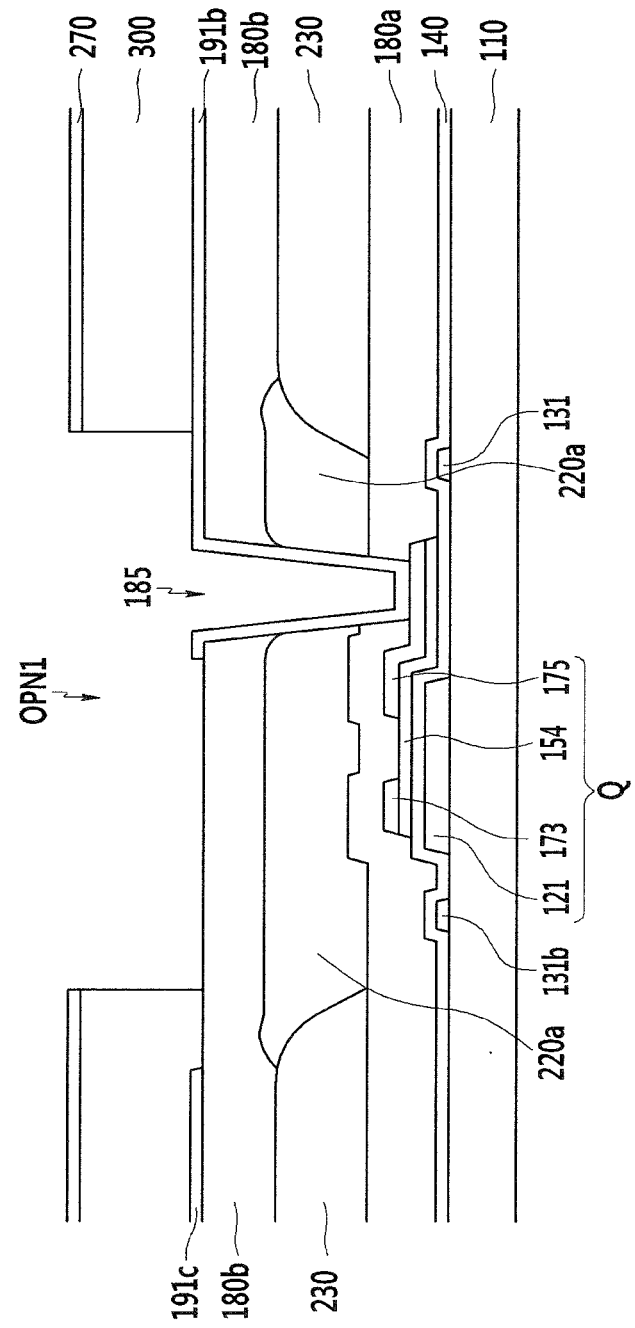
Figure 9:
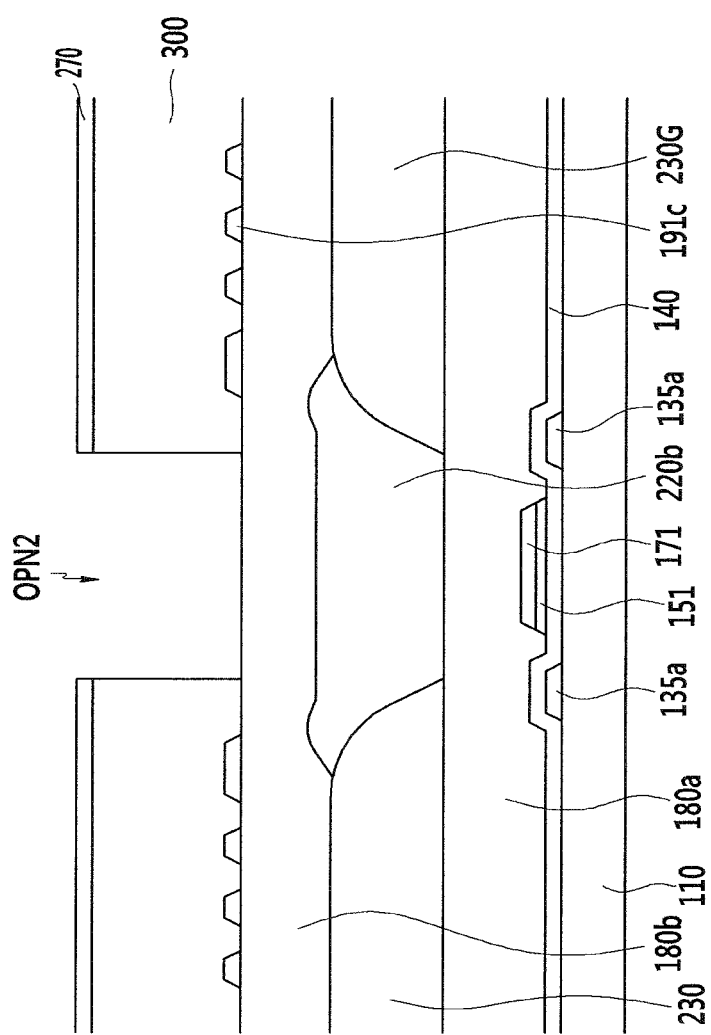

Referring to FIGS. 8 and 9, a first open portion OPN1 and a second open portion OPN2 are formed in the sacrificial layer 300 by etching the sacrificial layer 300 exposed by the first opening 271 and the second opening 272 by using the common electrode 270 as a mask. The first open portion OPN1 is formed at the portion corresponding to the horizontal light blocking member 220a, and the second open portion OPN2 is formed at the portion corresponding to the vertical light blocking member 220b. Here, the etching is performed by dry etching. As the etching is performed by dry etching, the side surface or side profile of the sacrificial layer 300 at the first open portion OPN1 and the second open portion OPN2 becomes 80° to 90° with respect to a horizontal plane.

Figure 10:
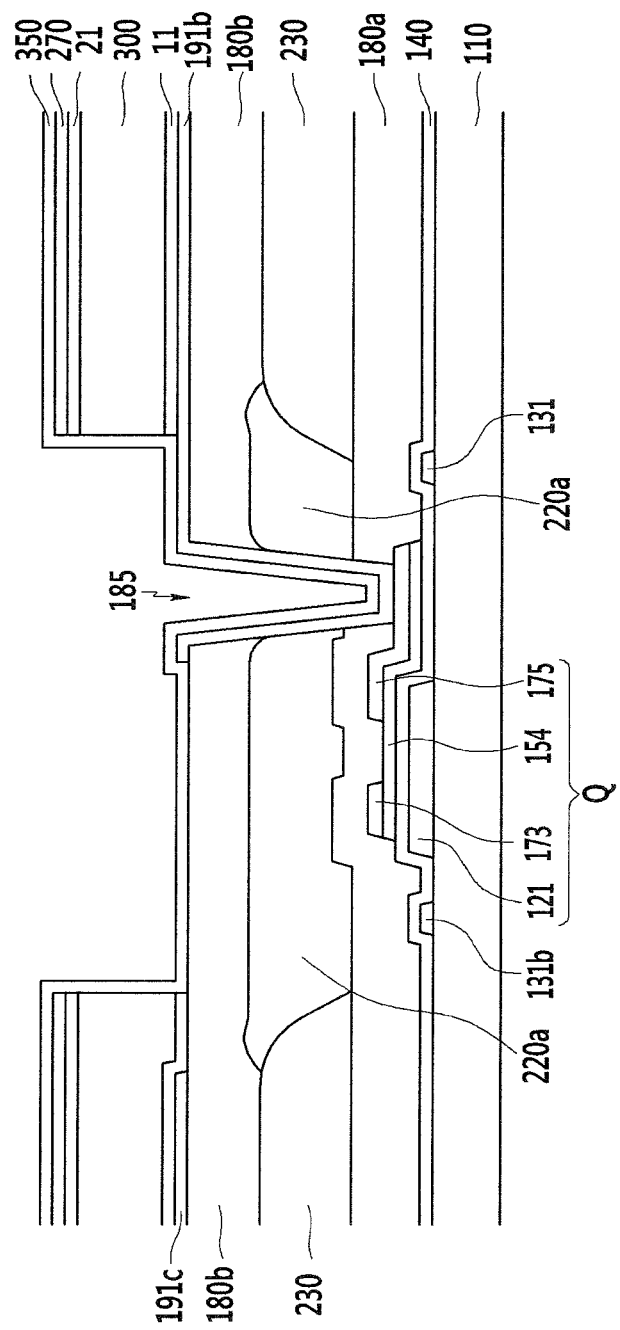
Figure 11:
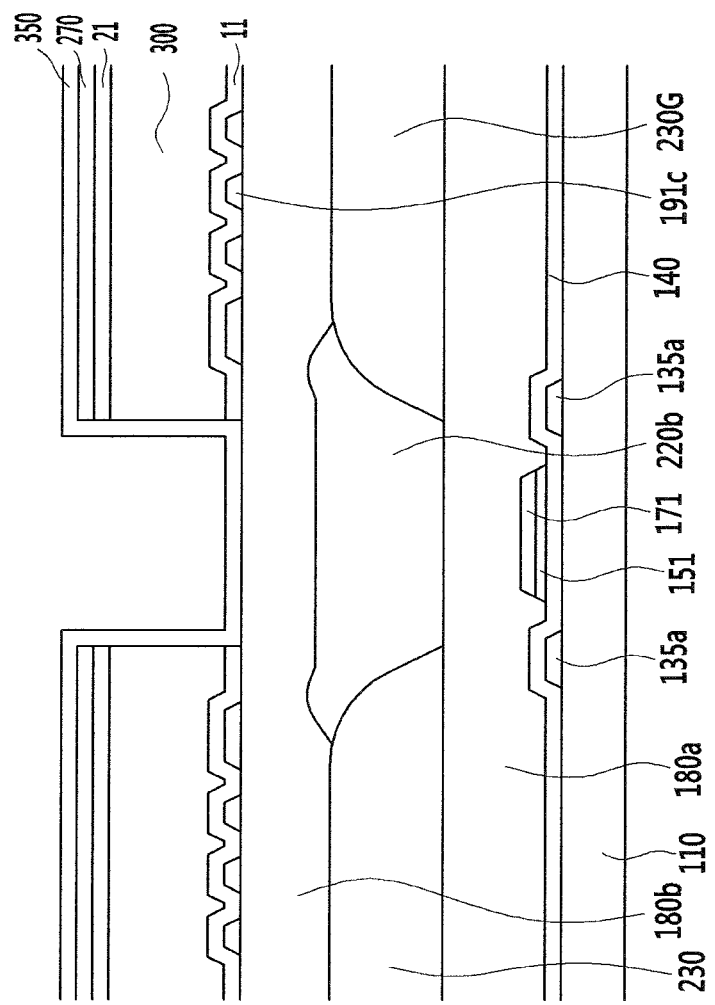

Referring to FIGS. 10 and 11, a lower insulating layer 350 is formed at the common electrode 270, the first open portion OPN1, and the second open portion OPN2. Heat is generated when the lower insulating layer 350 is formed, and upper and lower portions of the sacrificial layer 300 are cured by the heat to form the upper alignment layer 21 and the lower alignment layer 11, respectively. As such, without a separate process of forming the upper and lower alignment layers 21 and 11, the sacrificial layer 300 is formed of an alignment layer forming material, and then the upper alignment layer 21 and the lower alignment layer 11 may be formed when the lower insulating layer 350 is formed.

Figure 12:
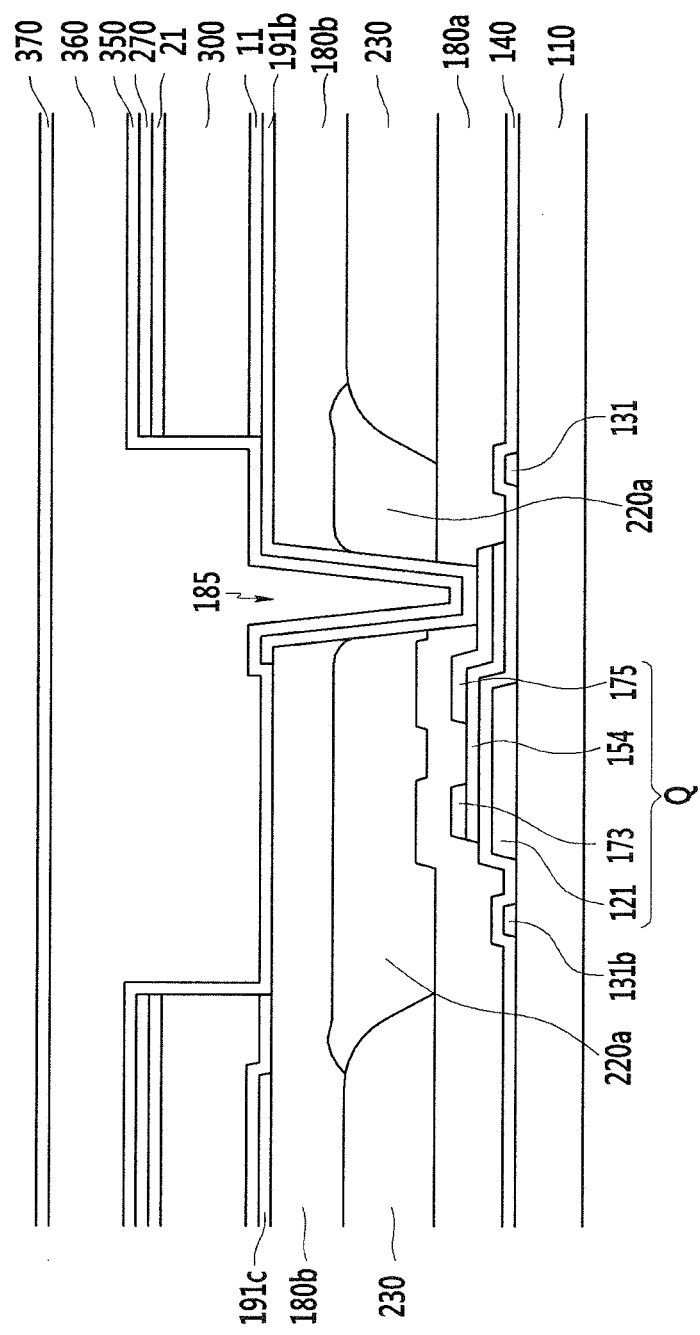
Figure 13:
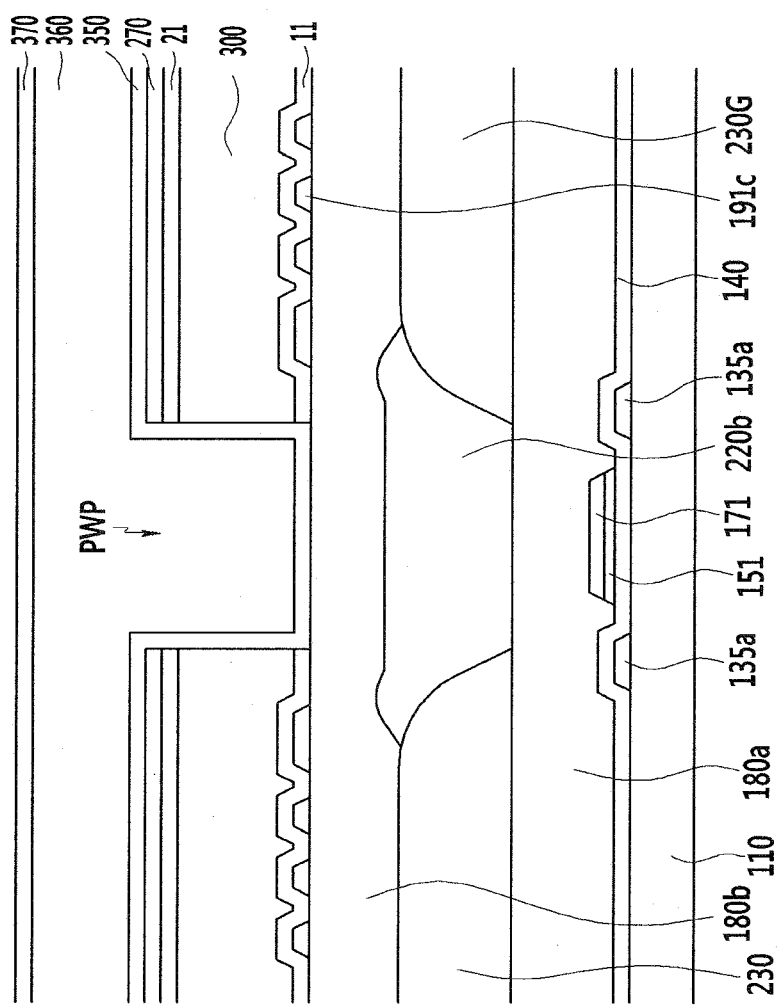

Referring to FIGS. 12 and 13, the roof layer 360 and the upper insulating layer 370 are sequentially formed on the lower insulating layer 350. Here, the roof layer 360 fills the first open portion OPN1 and the second open portion OPN2. Particularly, the roof layer 360 forms the partition wall formation portion PWP while filling the second open portion OPN2.

Figure 14:
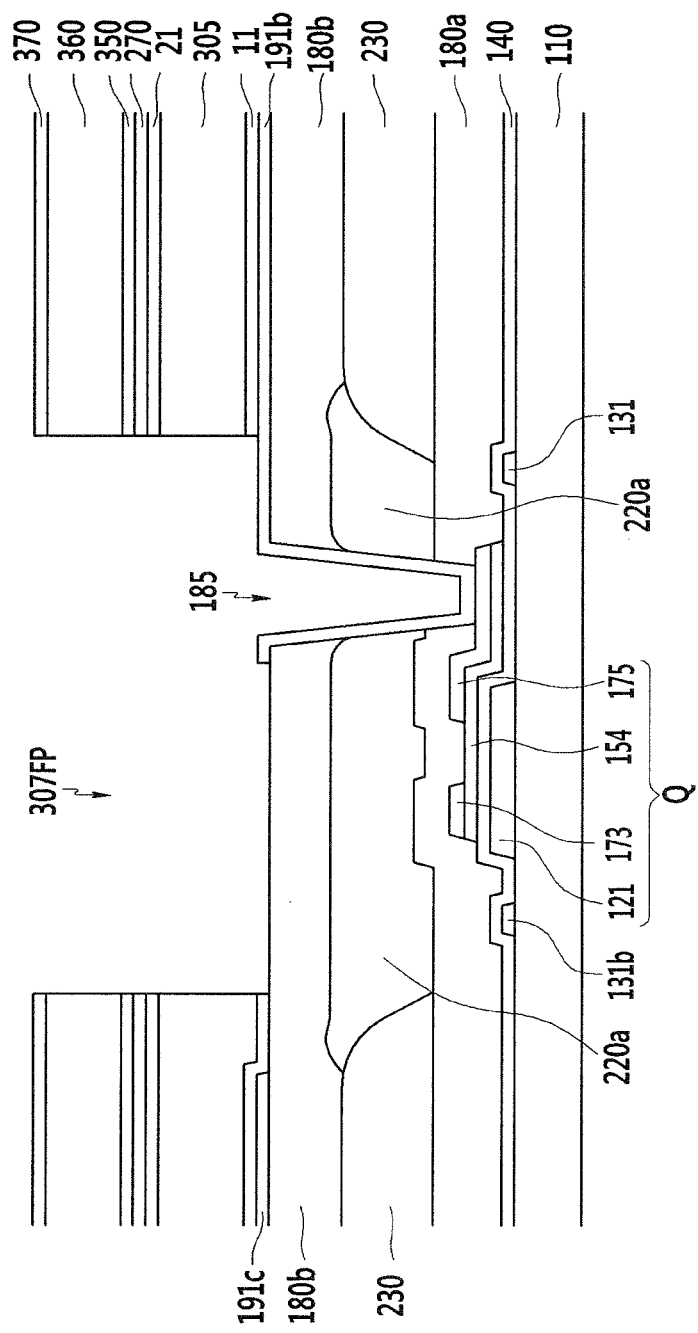

Referring to FIG. 14, the liquid crystal injection hole formation region 307FP is formed by etching the upper insulating layer 370 at the portion corresponding to the horizontal light blocking member 220a, the roof layer 360, and the lower insulating layer 350. Here, the etching of the upper insulating layer 370, the roof layer 360, and the lower insulating layer 350 may be performed by dry etching. Further, the liquid crystal injection hole formation region 307FP may correspond to the first open portion OPN1 of the sacrificial layer 300.

Figure 15:
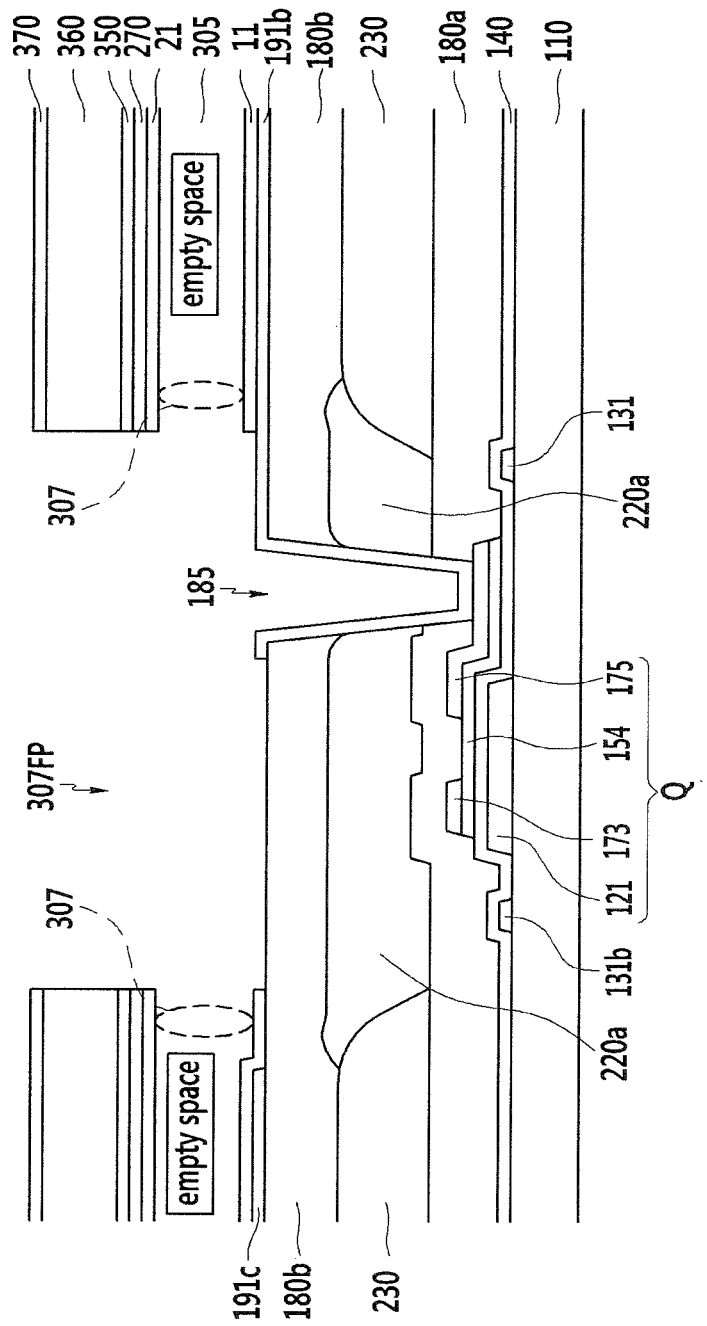
Figure 16:
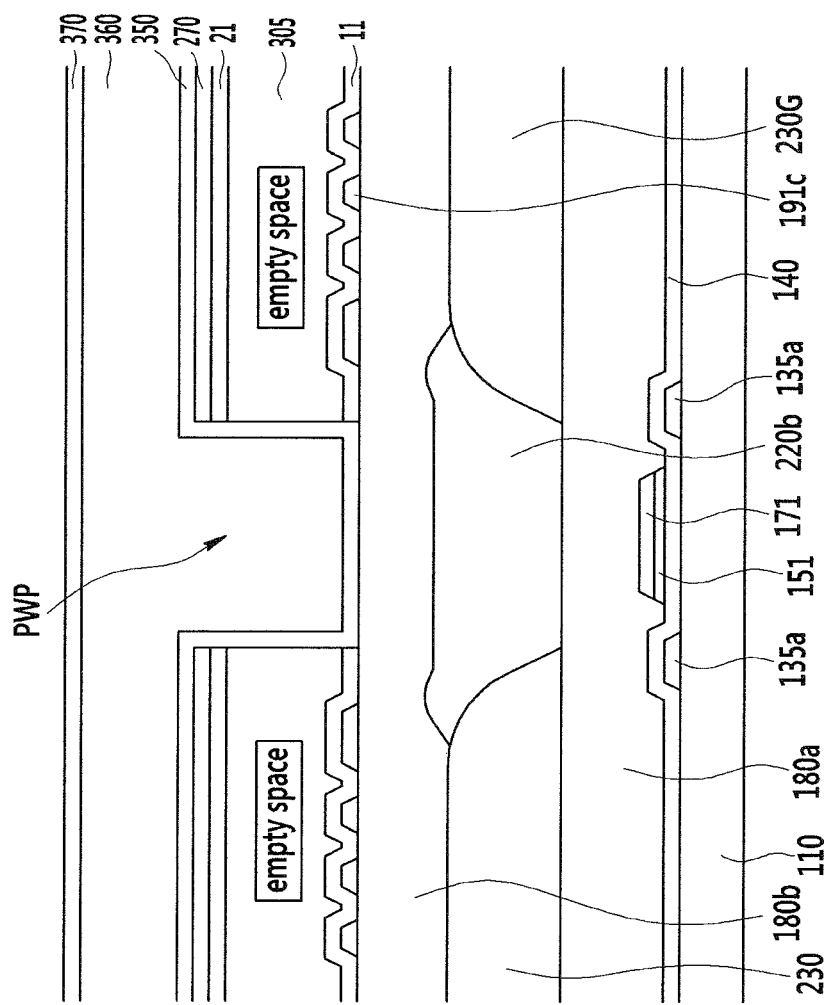

Referring to FIGS. 15 and 16, the material of the sacrificial layer 300 located between the upper and lower alignment layers is removed by an ashing process using oxygen ($O_2$) gas, a wet-etching method, or the like through the liquid crystal injection hole formation region 307FP. In this case, the microcavity 305 having the liquid crystal injection hole 307 is formed, and the liquid crystal injection hole 307 is positioned at the side of the microcavity 305. The microcavity 305 is an empty space formed when the sacrificial layer 300 is removed. In a final product, the microcavity 305 is surrounded by a plurality of walls, and the side wall of the microcavity has an angle of 80° to 90° with respect to the horizontal plane, which is substantially parallel to a major surface of the substrate. In an embodiment, during the foregoing ashing process, a portion of the sacrificial layer material cured into each of the alignment layers are not removed, while other portions of the sacrificial material are removed. Thus, a microcavity 305 can be formed between the alignment layers.

Figure 17:
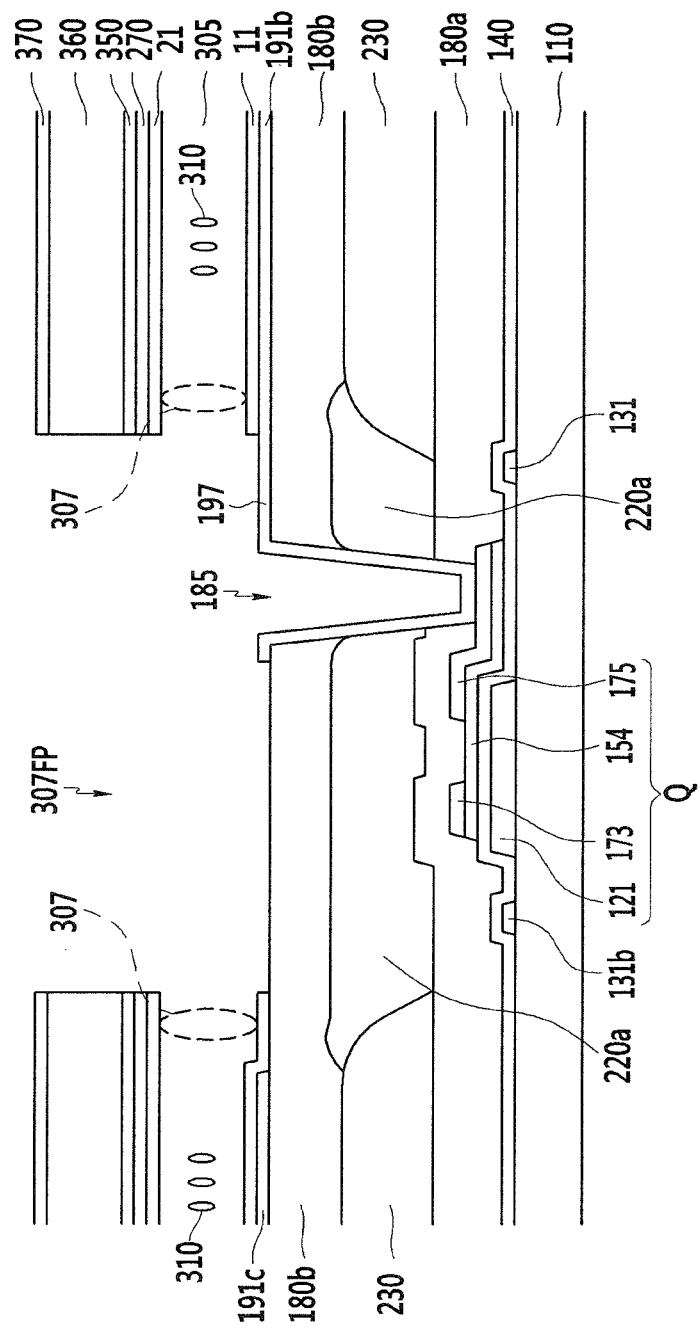
Figure 18:
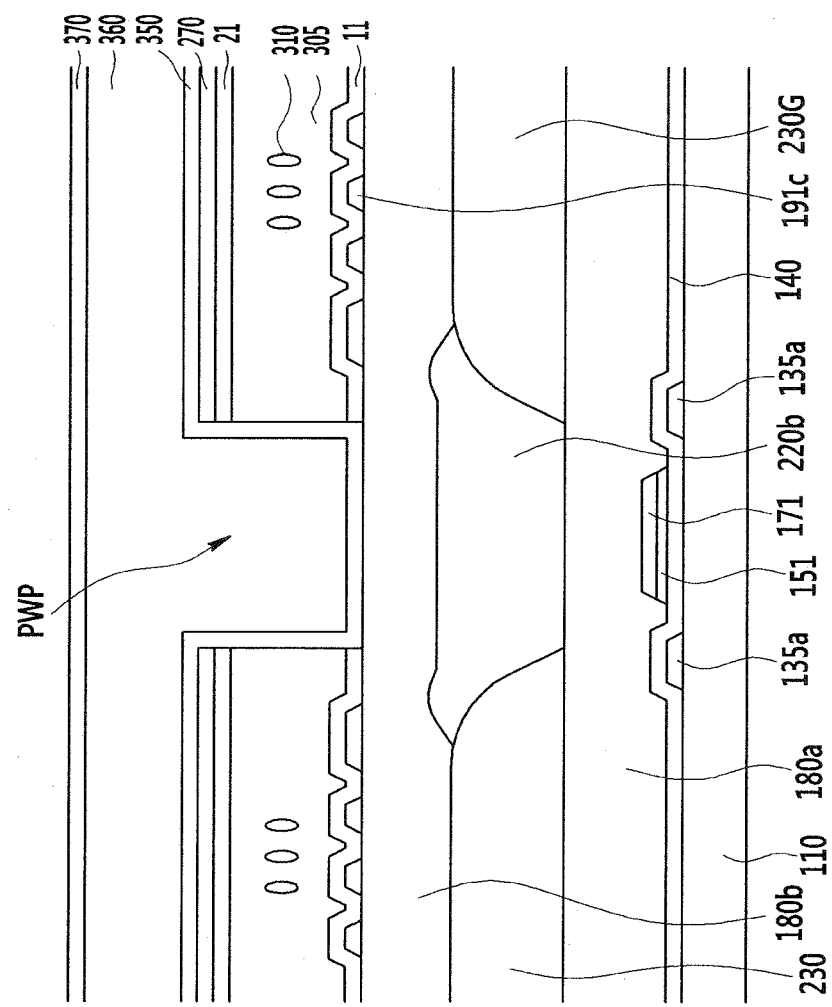

Referring to FIGS. 17 and 18, the liquid crystal material including the liquid crystal molecules 310 is injected into the microcavity 305 through the liquid crystal injection hole 307 by using an inkjet method and the like.

Referring to FIGS. 2 and 3, the capping layer 390 is formed on the upper insulating layer 370 to cover the liquid crystal injection hole 307. The capping layer 390 may cover the liquid crystal injection hole formation region 307FP. The capping layer 390 may be formed by pushing a capping material from an edge of the substrate 110 to an opposite edge by using a bar coater and simultaneously, performing UV-curing.

Hereinafter, a liquid crystal display according to another exemplary embodiment of the present invention will be described with reference to FIGS. 19 to 30.

Figure 19:
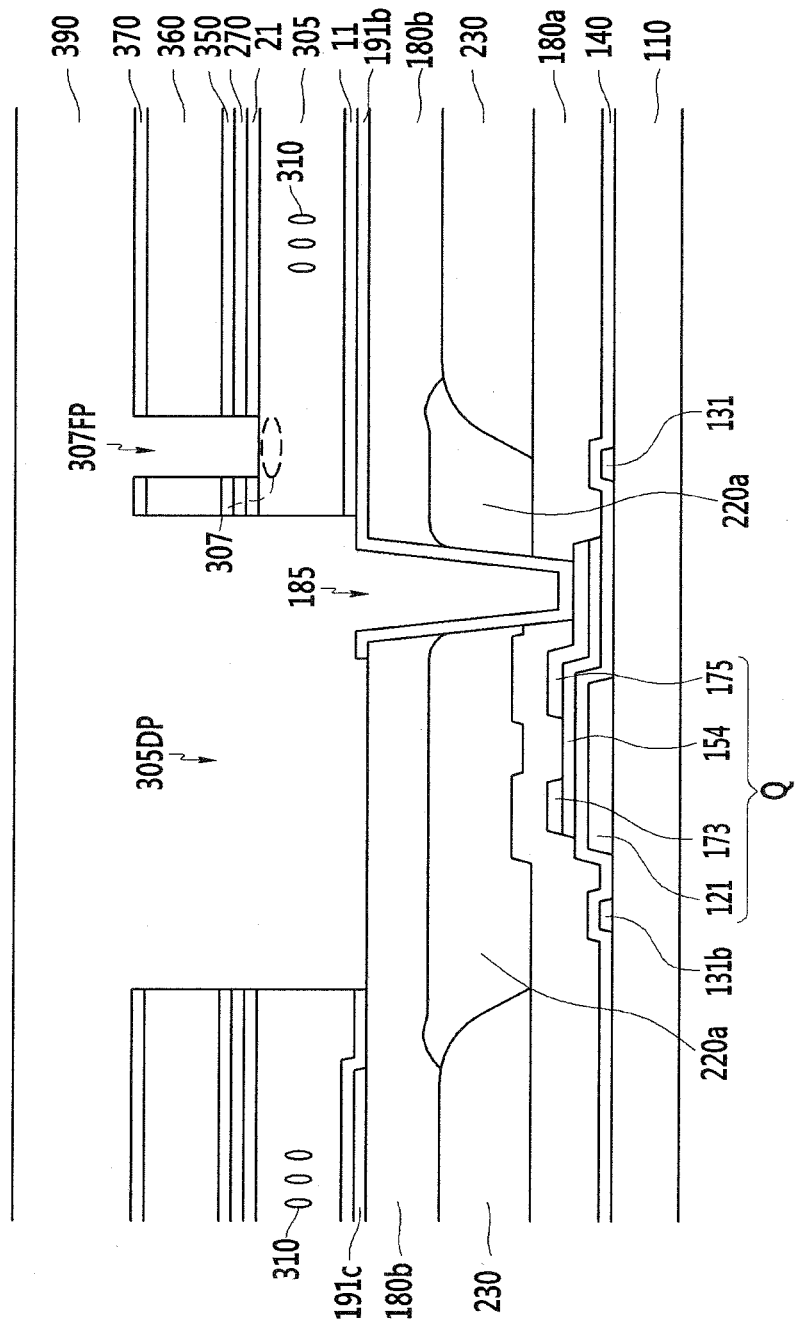
FIG. 19 is a cross-sectional view of a liquid crystal display according to another exemplary embodiment of the present invention.

FIG. 19 is a cross-sectional view of a liquid crystal display according to another exemplary embodiment of the present invention.

Referring to FIG. 19, when the liquid crystal display according to the exemplary embodiment is compared with the liquid crystal display of FIGS. 1 to 3, portions of the liquid crystal injection hole formation region and the liquid crystal injection hole are different, and dividing of the microcavity is different, but the remaining constituent elements are the same. Accordingly, the description of the same constituent elements is omitted.

The microcavity 305 is divided by a plurality of microcavity division regions 305DP, and the microcavity division regions 305DP are positioned to overlap with the gate line 121. The microcavity division region 305DP is filled with the roof layer 360.

The liquid crystal injection hole formation region 307FP is formed on the upper alignment layer 21 disposed on the microcavity 305, the common electrode 270, the lower insulating layer 350, the roof layer 360, and the upper insulating layer 370. The liquid crystal injection hole formation region 307FP is filled with the capping layer 390.

The liquid crystal injection hole 307 is formed on a top wall of the microcavity 305, and positioned in the liquid crystal injection hole formation region 307FP. In the exemplary embodiment, the structure in which one liquid crystal injection hole 307 is disposed based on one microcavity 305 is described, but the present invention is not limited thereto, and a plurality of liquid crystal injection holes 307 may be disposed.

A liquid crystal material including liquid crystal molecules 310 is injected into the microcavity 305 through the liquid crystal injection hole 307 positioned on the upper surface of the microcavity 305. The side profile of the microcavity has an angle of 80° to 90° with respect to the horizontal plane.

Next, a manufacturing method of a liquid crystal display according to another exemplary embodiment of the present invention will be described with reference to FIGS. 20 to 31, 19, and 3.

Meanwhile, since the structure of the liquid crystal display according to the exemplary embodiment is different from the structure of the liquid crystal display of FIGS. 1 to 3 only in the liquid crystal injection hole formation region and a position of the liquid crystal injection hole, but other constituent elements are the same as each other, the same portions with the manufacturing method of the liquid crystal display of FIGS. 1 to 3 are briefly described. Further, since drawings illustrated in FIGS. 3 and 18 are the same as the manufacturing method of the liquid crystal display according to the exemplary embodiment, FIGS. 3 and 18 will be described together in the manufacturing method of the liquid crystal display according to the exemplary embodiment.

FIGS. 20 to 31 illustrate cross-sectional views the manufacturing method of a liquid crystal display according to another exemplary embodiment of the present invention. FIGS. 20, 22, 24, 26, 28, 29 and 31 illustrate cross-sectional views of FIG. 1 taken along line II-II in the order of the manufacturing method. FIGS. 21, 23, 25, 27, and 30 illustrate cross-sectional views of FIG. 1 taken along line in the order of the manufacturing method.

Figure 20:
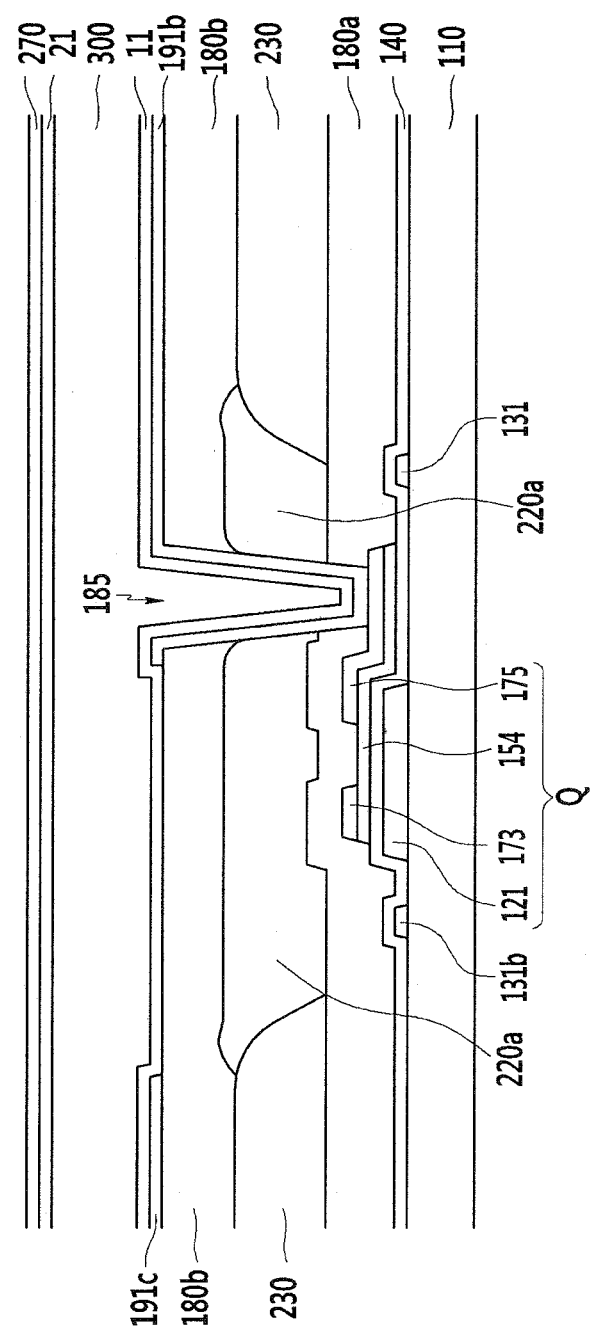
FIGS. 20 to 31 are cross-sectional views illustrating a manufacturing method of a liquid crystal display according to another exemplary embodiment of the present invention.
Figure 21:
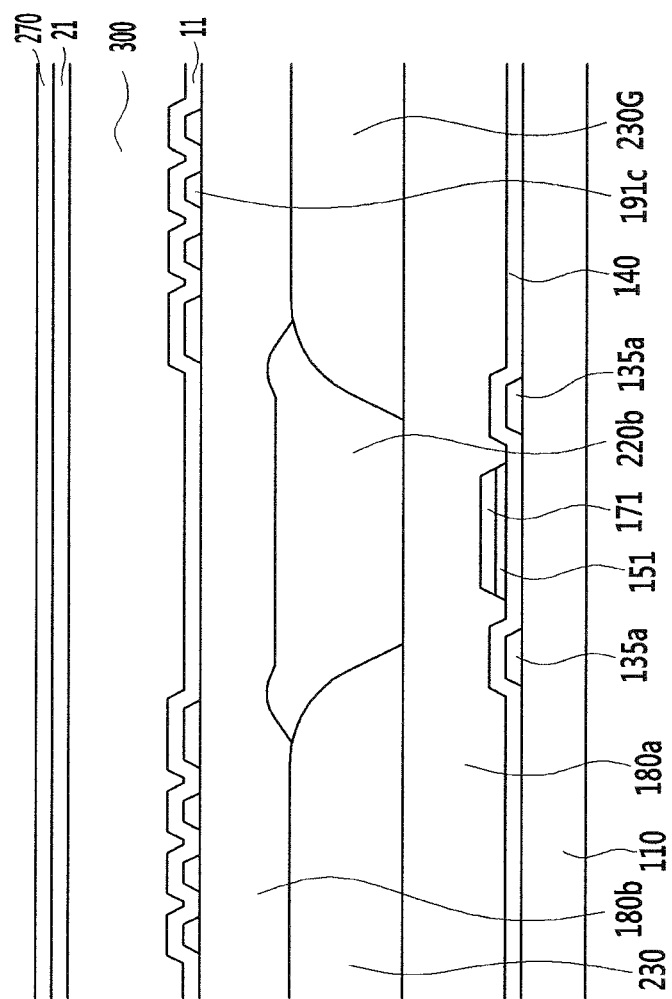

Referring to FIGS. 20 and 21, the gate line 121 and the storage electrode line 131 are formed on the substrate 110, the gate insulating layer 140 is formed on the gate line 121 and the storage electrode line 131, the semiconductor layer 151 is formed on the gate insulating layer 140, and then the data line 171 and the drain electrode 175 are formed on the semiconductor layer 151.

In addition, the first interlayer insulating layer 180a is formed on the data line 171, the drain electrode 175, the protrusion 154 of the semiconductor layer 151 between the source electrode 173 and the drain electrode 175, and the gate insulating layer 140, and the color filter 230, the horizontal light blocking member 220a, and the vertical light blocking member 220b are formed on the first interlayer insulating layer 180a. The color filter 230 is formed in the opening by the horizontal light blocking member 220a and the vertical light blocking member 220b.

In addition, the second interlayer insulating layer 180b is formed on the color filter 230, the horizontal light blocking member 220a, and the vertical light blocking member 220b, and then the contact hole 185 exposing a part of the drain electrode 175 is formed in the horizontal light blocking member 220a, and the first and second interlayer insulating layers 180a and 180b.

In addition, the pixel electrode 191 connected with the drain electrode 175 through the contact hole 185 is formed on the second interlayer insulating layer 180b.

Subsequently, the lower alignment layer 11, the sacrificial layer 300, the upper alignment layer 21, and the common electrode 270 are sequentially formed on the pixel electrode 191 and the second interlayer insulating layer 180b. Here, the lower alignment layer 11 and the upper alignment layer 21 are formed of an alignment layer forming material such as polyimide, and the sacrificial layer 300 is formed of a resin without a photosensitive material. As such, since the lower alignment layer 11 and the upper alignment layer 21 are first formed before the microcavity 304 is formed, a process of injecting the alignment layer forming material into the microcavity 305 is not required. In an embodiment, the alignment layers can be formed of by curing the sacrificial material as discussed above with reference to FIGS. 10 and 11.

Figure 22:
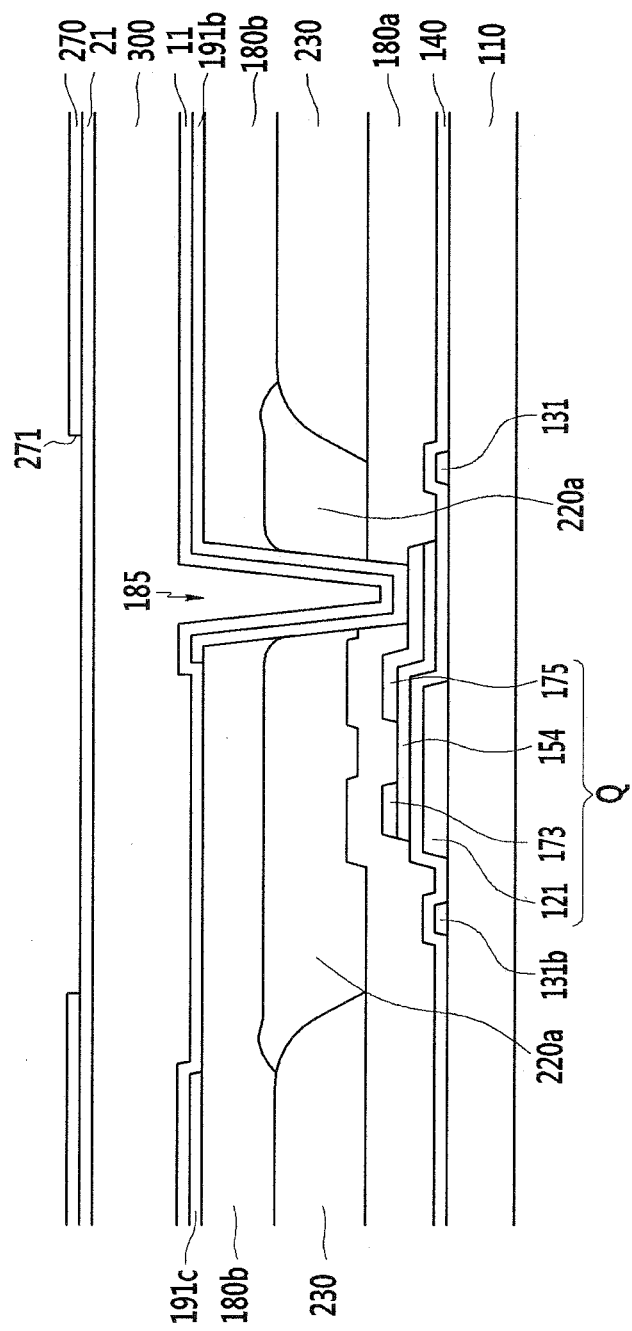
Figure 23:
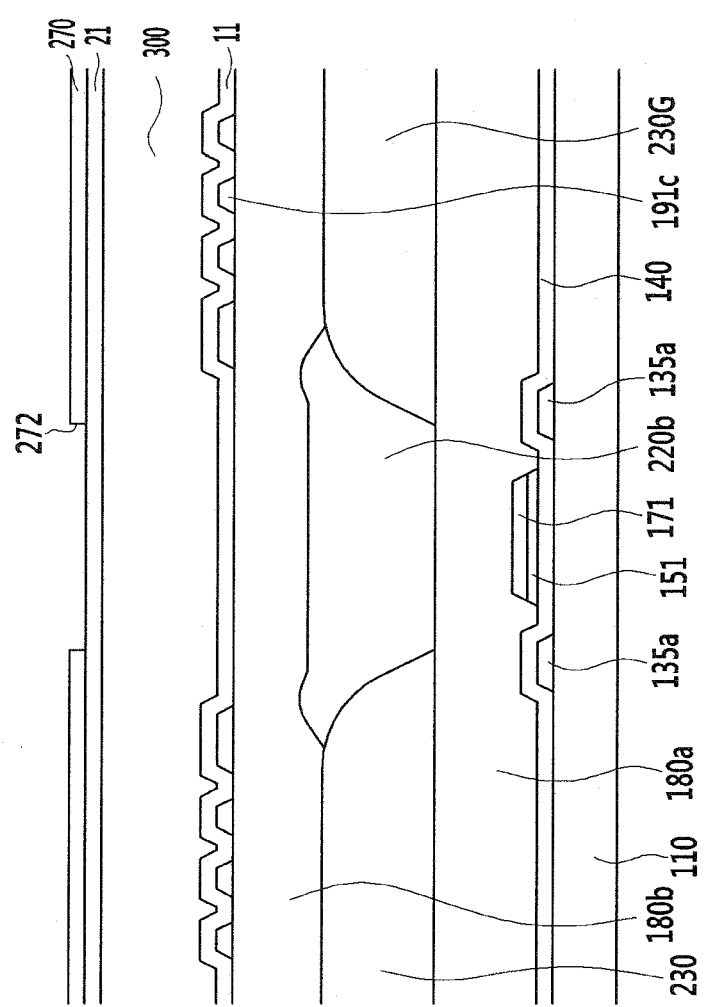

Referring to FIGS. 22 and 23, a first opening 271 and a second opening 272 are formed by patterning the common electrode 270. The first opening 271 is formed at the portion corresponding to the horizontal light blocking member 220a, and the second opening 272 is formed at the portion corresponding to the vertical light blocking member 220b.

Figure 24:
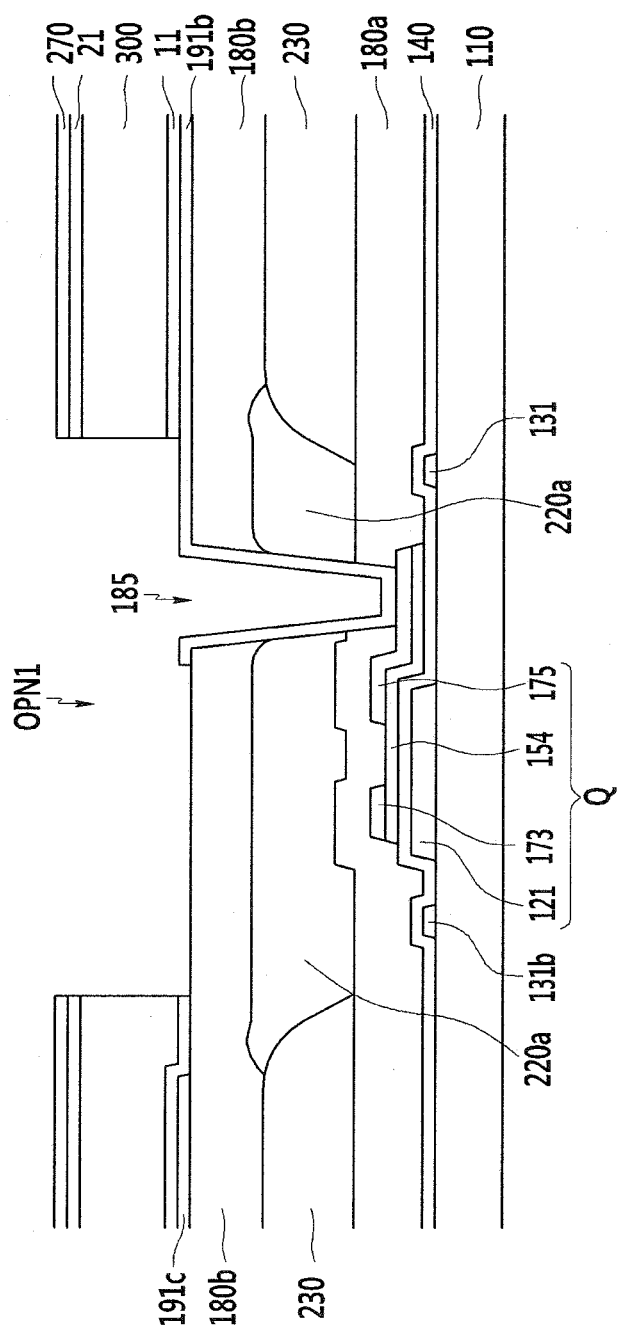
Figure 25:
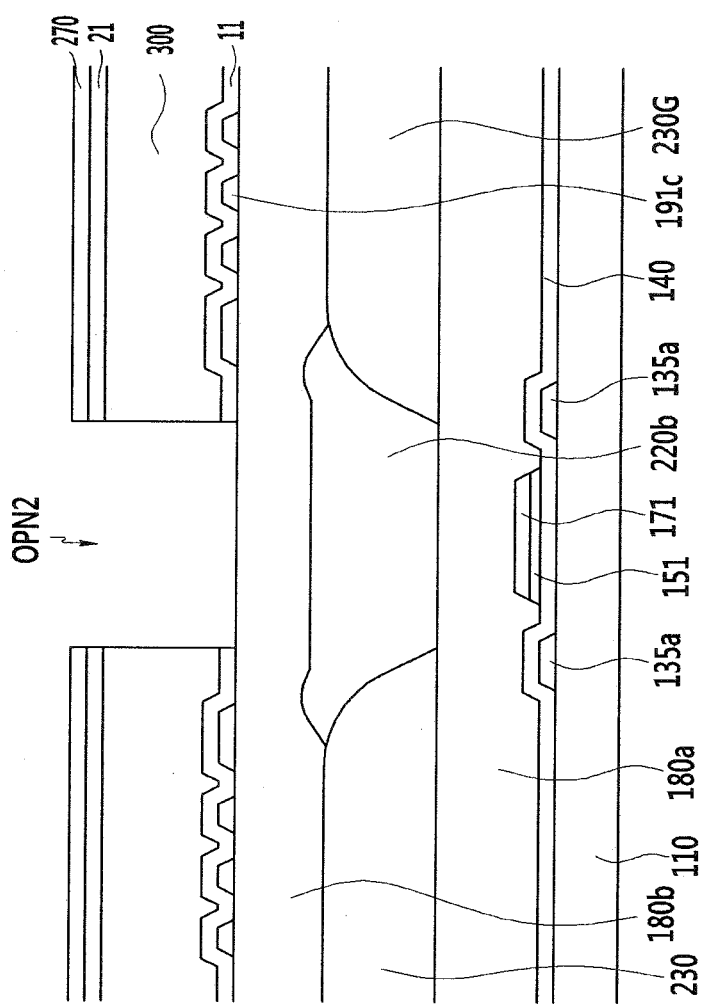

Referring to FIGS. 24 and 25, a first open portion OPN1 and a second open portion OPN2 are formed by etching the upper alignment layer 21 exposed by the first opening 271 and the second opening 272, and the sacrificial layer 300 and the lower alignment layer 11 positioned below the exposed upper alignment layer 21 by using the common electrode 270 as a mask. The first open portion OPN1 is formed at the portion corresponding to the horizontal light blocking member 220a, and the second open portion OPN2 is formed at the portion corresponding to the vertical light blocking member 220b. Here, the etching is performed by dry etching. As the etching is performed by dry etching, the side profile of the upper alignment layer 21, the sacrificial layer 300, and the lower alignment layer 11 at the first open portion OPN1 and the second open portion OPN2 becomes 80° to 90° with respect to a horizontal plane.

Figure 26:
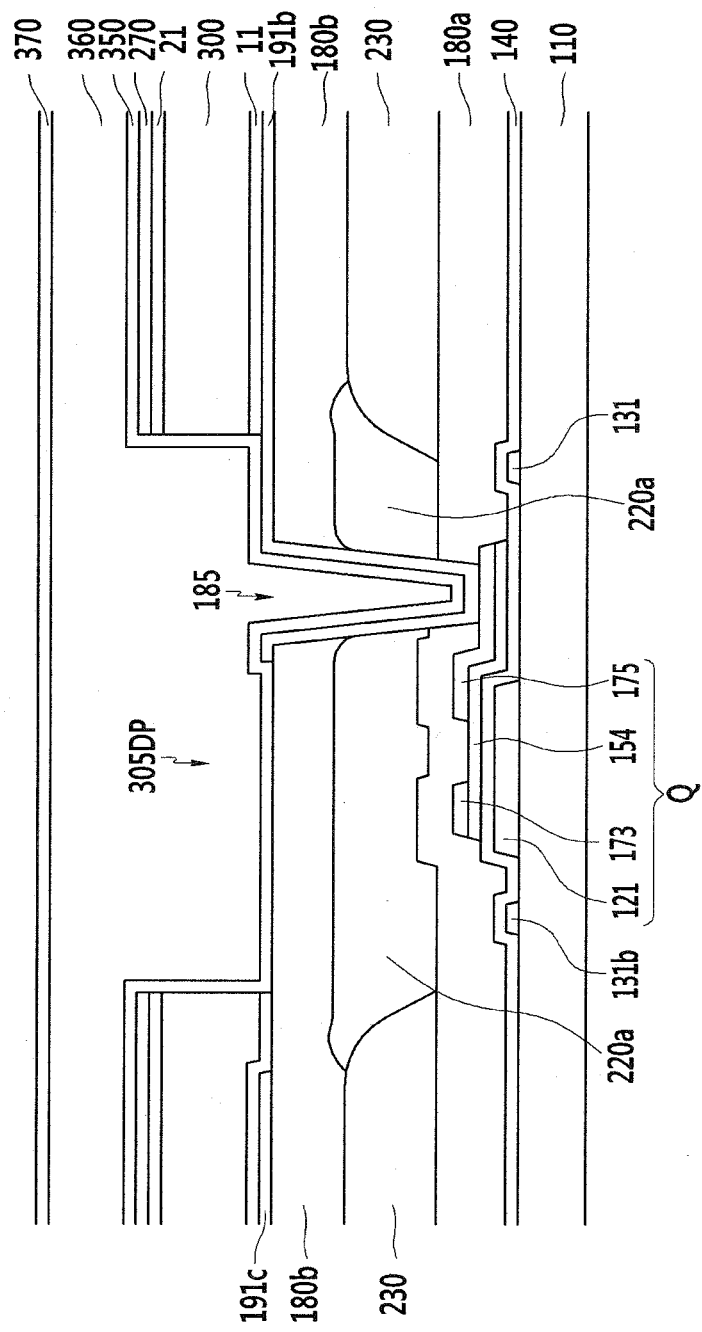
Figure 27:
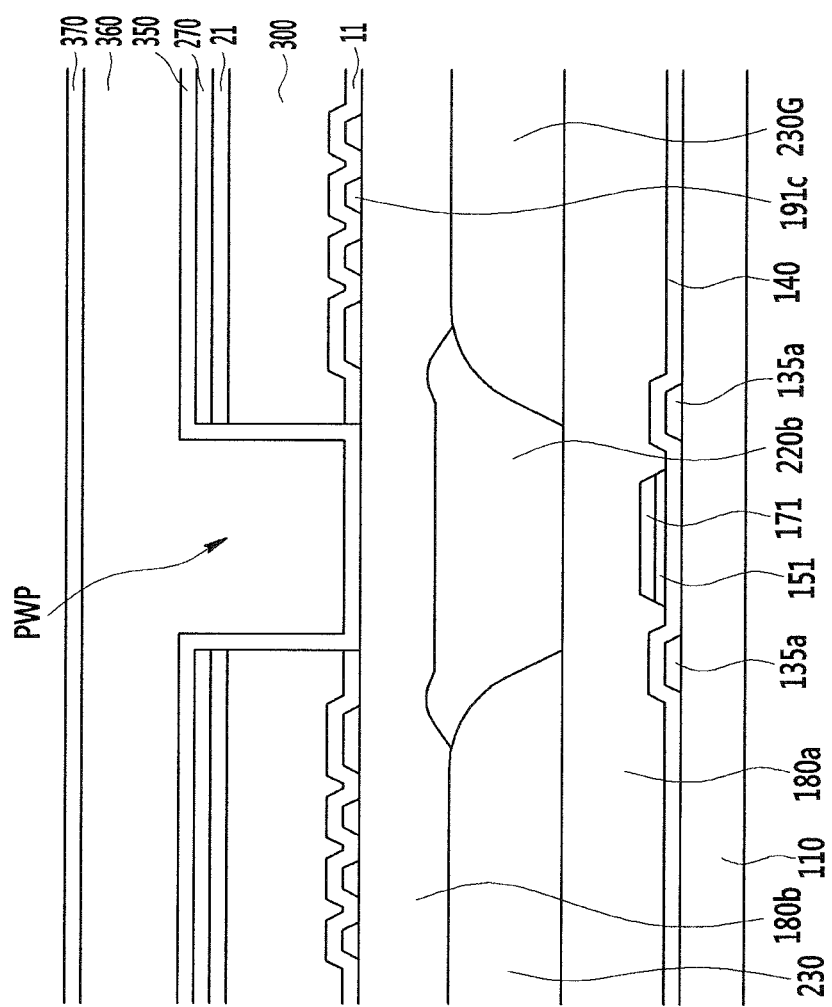

Referring to FIGS. 26 and 27, the lower insulating layer 350, the roof layer 360, and the upper insulating layer 370 are sequentially formed at the common electrode 270, the first open portion OPN1, and the second open portion OPN2. Here, the roof layer 360 fills the first open portion OPN1 and the second open portion OPN2, and the microcavity division region 305DP is formed by filling the first open portion OPN1 and the partition wall formation portion PWP is formed by filling the second open portion OPN2.

Figure 28:
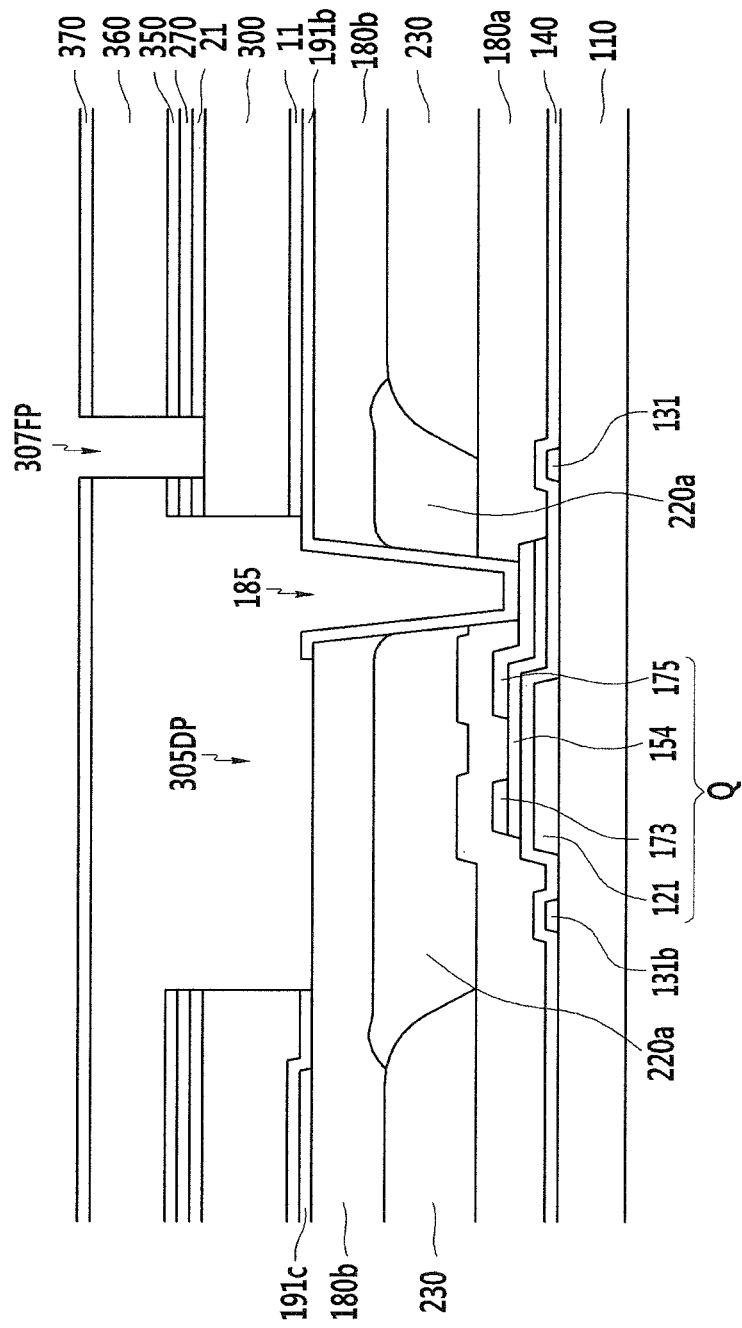

Referring to FIG. 28, the liquid crystal injection hole formation region 307FP is formed by etching the upper insulating layer 370 positioned on the sacrificial layer 300, the roof layer 360, and the lower insulating layer 350. The liquid crystal injection hole formation region 307FP is formed at a portion corresponding to the horizontal light blocking member 220a. Here, the etching of the upper insulating layer 370, the roof layer 360, and the lower insulating layer 350 may be performed by dry etching.

Figure 29:
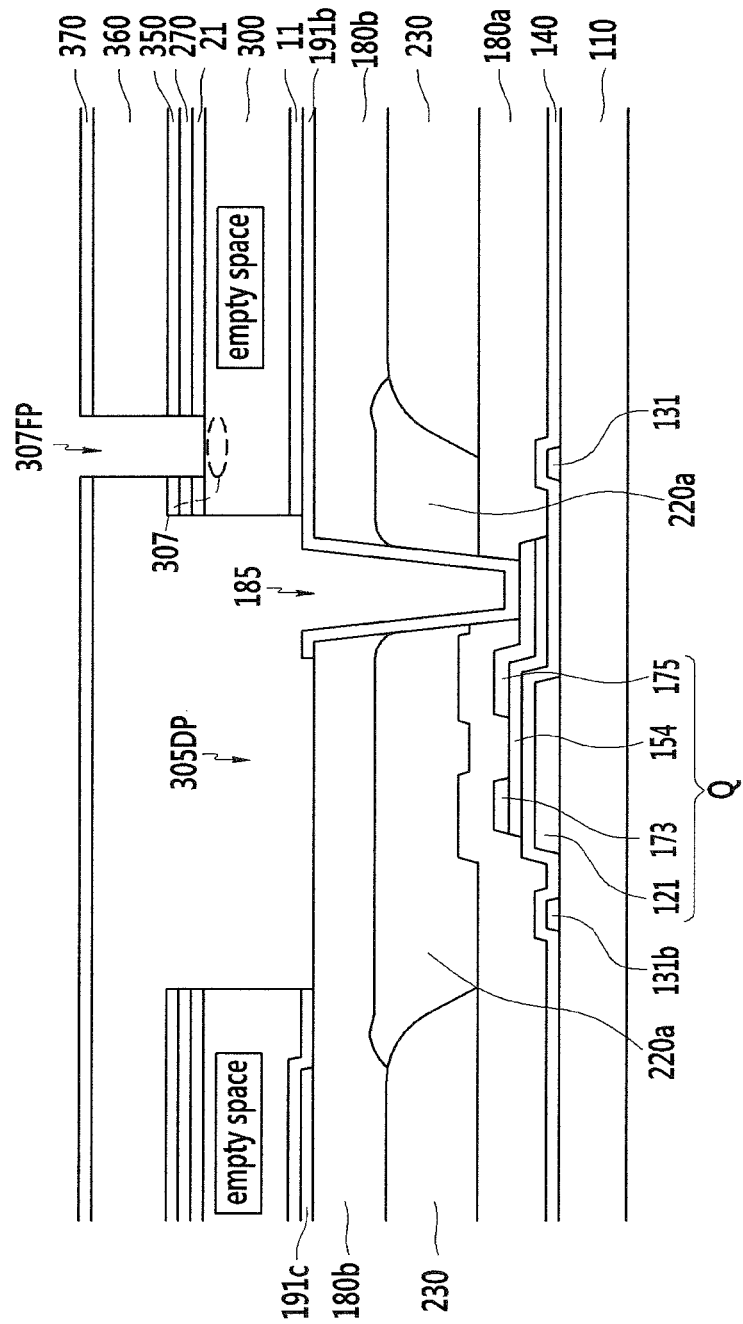
Figure 30:
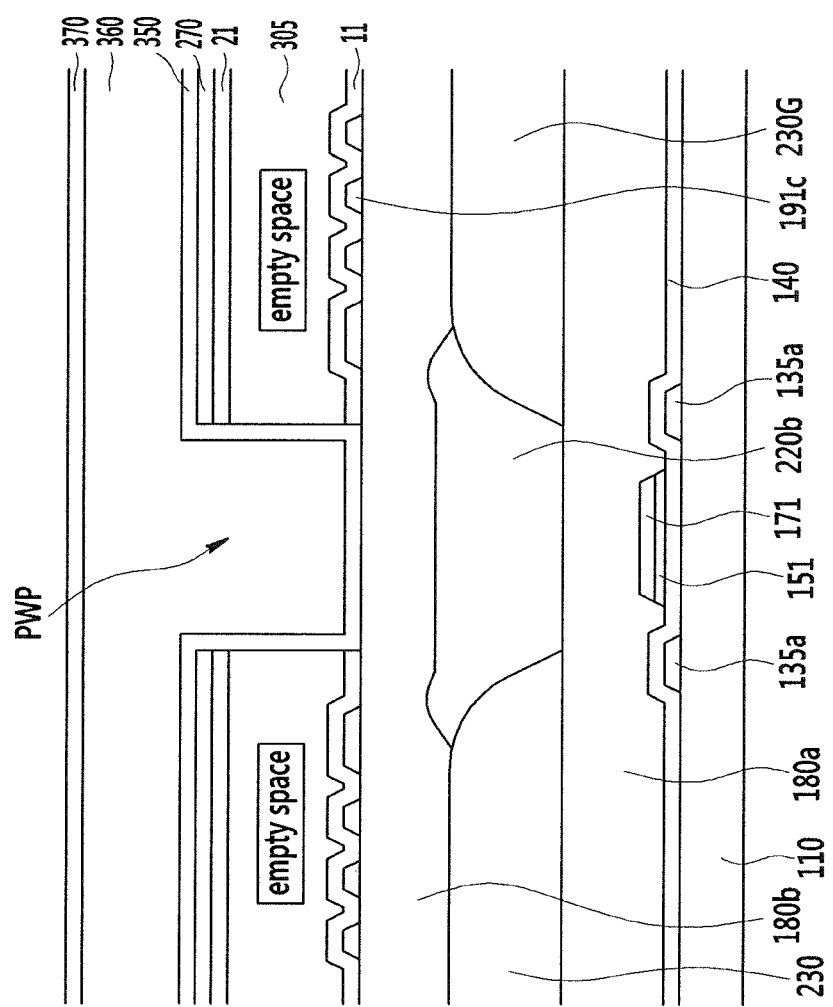

Referring to FIGS. 29 and 30, the sacrificial layer 300 is removed by an ashing process using oxygen ($O_2$) gas, a wet-etching method, or the like through the liquid crystal injection hole formation region 307FP. In this case, the microcavity 305 having the liquid crystal injection hole 307 is formed. The microcavity 305 is an empty space formed when the sacrificial layer 300 is removed. The side profile of the microcavity has an angle of 80° to 90° with respect to the horizontal plane surface.

Figure 31:
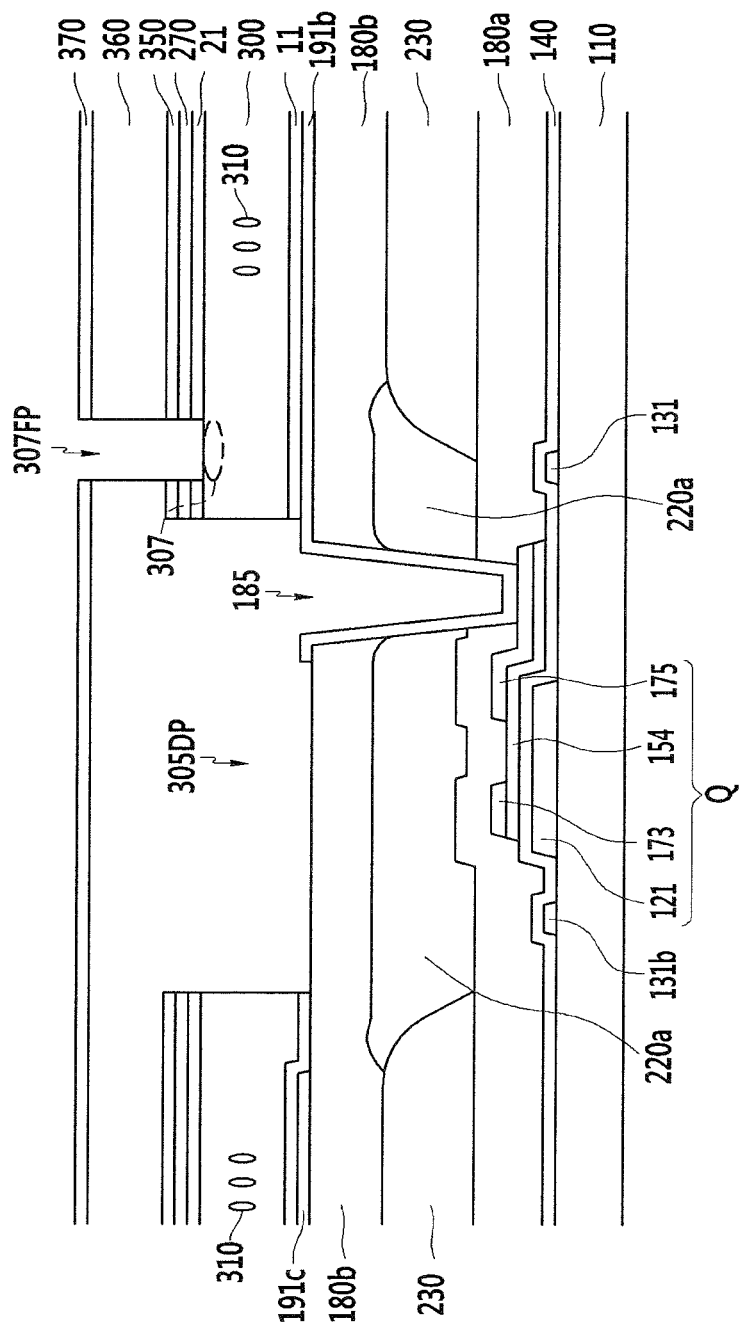

Referring to FIGS. 31 and 18, the liquid crystal material including the liquid crystal molecules 310 is injected into the microcavity 305 through the liquid crystal injection hole 307 by using an inkjet method and the like.

Referring to FIGS. 19 and 3, the capping layer 390 is formed on the upper insulating layer 370 to cover the liquid crystal injection hole 307. The capping layer 390 may cover the liquid crystal injection hole formation region 307FP. The capping layer 390 may be formed by pushing a capping material from an edge of the substrate 110 to an opposite edge by using a bar coater and simultaneously, performing UV-curing.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 110: Substrate | 121: Gate line |
| 171: Data line | 191: Pixel electrode |
| 230: Color filter | 270: Common electrode |
| 271: First opening | 272: Second opening |
| 300: Sacrificial layer | 305: Microcavity |
| 305DP: Microcavity division region | 307: Liquid crystal injection hole |
| 307FP: Liquid crystal injection hole formation region | 310: Liquid crystal molecule |
| 350: Lower insulating layer | 360: Roof layer |
| 370: Upper insulating layer | 390: Capping layer |
| OPN1: First open portion | OPN2: Second open portion |
| PWP: Partition wall formation portion | |

What is claimed is:

1. A liquid crystal display, comprising:
   a substrate comprising a major surface;
   a thin film transistor disposed over the substrate;
   a pixel electrode electrically connected to the thin film transistor and disposed over the thin film transistor;
   a common electrode facing the pixel electrode;
   a roof layer disposed over the common electrode;
   a capping layer disposed over the roof layer;
   a microcavity disposed between the pixel electrode and the common electrode; and
   a liquid crystal material contained in the microcavity,
   wherein a side wall of the microcavity has an angle of 80° to 90° with respect to the major surface,
   wherein the side wall includes liquid crystal injection holes, and
   wherein the capping layer covers the liquid crystal injection holes in the side wall of the microcavity.

2. The liquid crystal display of claim 1, wherein the microcavity is surrounded by walls with the liquid crystal injection holes through which the liquid crystal material has been injected.

3. The liquid crystal display of claim 2, further comprising a gate line and a data line disposed over the substrate and connected to the thin film transistor.

4. The liquid crystal display of claim 3, further comprising a second microcavity and a partition disposed between the microcavity and the second microcavity, and the partition extending along the data line.

5. The liquid crystal display of claim 4, further comprising a third microcavity and a second partition disposed between the microcavity and the third microcavity, and the second partition covering the liquid crystal injection holes, and extending along the gate line.

6. A method of making a liquid crystal display, comprising:
   forming a thin film transistor over a substrate comprising a major surface;
   forming a pixel electrode electrically connected to the thin film transistor;
   sequentially forming a sacrificial layer and a common electrode over the pixel electrode;
   patterning the common electrode to form a first opening and a second opening;
   etching the sacrificial layer exposed by the first opening and the second opening using the common electrode as a mask to form a first channel and a second channel in the sacrificial layer, respectively;
   forming a lower insulating layer over the common electrode and within the first channel and the second channel;
   curing an upper portion of the sacrificial layer and a lower portion of the sacrificial layer to form an upper alignment layer and a lower alignment layer, respectively;
   forming a roof layer over the lower insulating layer;
   removing the lower insulating layer and the roof layer positioned within the first channel;

removing a portion of the sacrificial layer which is located between the upper alignment layer and the lower alignment layer to form a microcavity with a liquid crystal injection hole;

injecting a liquid crystal material into the microcavity through the liquid crystal injection hole; and forming a capping layer over the roof layer and within the first channel to cover the liquid crystal injection hole, wherein a side surface of the sacrificial layer exposed through each of the first channel and the second channel has an angle of 80° to 90° with respect to the major surface.

7. The method of claim 6, wherein the sacrificial layer is formed of an alignment layer forming material.

8. The method of claim 7, wherein the curing of the upper portion of the sacrificial layer and the lower portion of the sacrificial layer is performed by heat generated when the lower insulating layer is cured.

9. The method of claim 8, wherein the etching of the sacrificial layer is performed by dry etching.

10. The method of claim 9, wherein the liquid crystal injection hole is positioned at the side of the microcavity.

11. The method of claim 6, wherein a side wall of the microcavity has an angle of 80° to 90° with respect to the major surface.

12. A method of making a liquid crystal display, comprising:

forming a thin film transistor over a substrate comprising a major surface;

forming a pixel electrode electrically connected to the thin film transistor;

sequentially forming a lower alignment layer, a sacrificial layer, an upper alignment layer, and a common electrode over the pixel electrode;

patterning the common electrode to form a first channel and a second channel;

etching the upper alignment layer, the sacrificial layer and the lower alignment layer using the common electrode as a mask to form a first channel and a second channel;

sequentially forming a lower insulating layer and a roof layer over the common electrode and within the first channel and the second channel;

forming a liquid crystal injection hole through the upper alignment layer, the lower insulating layer and the roof layer;

removing the sacrificial layer to form a microcavity;

injecting a liquid crystal material into the microcavity through the liquid crystal injection hole; and forming a capping layer over the roof layer to cover the liquid crystal injection hole, wherein a side surface of the sacrificial layer exposed through each of the first channel and the second channel has an angle of 80° to 90° with respect to the major surface.

13. The method of claim 12, wherein the etching of the upper alignment layer, the sacrificial layer, and the lower alignment layer is performed by a dry etching process.

14. The method of claim 13, wherein the liquid crystal injection hole is formed at the top of the microcavity.

15. The method of claim 12, wherein a side wall of the microcavity has an angle of 80° to 90° with respect to the major surface.

* * * * *